United States Patent
Croke et al.

(10) Patent No.: US 11,581,963 B2
(45) Date of Patent: Feb. 14, 2023

(54) SYSTEMS AND METHODS FOR IN-LINE INTERFERENCE DETECTION IN POINT-TO-POINT RADIO LINKS

(71) Applicant: Aviat U.S., Inc., Austin, TX (US)

(72) Inventors: Gary Croke, Mill Valley, CA (US); Sergio Licardie, Cupertino, CA (US); Robert Vilhar, Ljubljana (SI); Sreco Plevel, Domzale (SI); Marius Koegelenberg, Pretoria (ZA)

(73) Assignee: Aviat U.S., Inc., Austin, TX (US)

( * ) Notice: Subject to any disclaimer, the term of this patent is extended or adjusted under 35 U.S.C. 154(b) by 0 days.

(21) Appl. No.: 17/724,370

(22) Filed: Apr. 19, 2022

(65) Prior Publication Data
US 2022/0255648 A1    Aug. 11, 2022

Related U.S. Application Data

(63) Continuation of application No. 17/180,248, filed on Feb. 19, 2021, now Pat. No. 11,309,978.
(Continued)

(51) Int. Cl.
*H04B 17/345* (2015.01)
*H04B 1/10* (2006.01)

(52) U.S. Cl.
CPC .................... *H04B 17/345* (2015.01)

(58) Field of Classification Search
CPC .......... H04B 1/06; H04B 1/10; H04B 1/1027; H04B 7/0632; H04B 10/07953;
(Continued)

(56) References Cited

U.S. PATENT DOCUMENTS

| 7,813,701 B2* | 10/2010 | Strong | H04L 5/0044 455/67.11 |
| 8,666,319 B2 | 3/2014 | Kloper et al. | |

(Continued)

OTHER PUBLICATIONS

Cuzanauskas, Tomas, et al., "Cognitive Radio Test Bed for Optimized Channel Selection in IEEE 802.11-based networks", ACM, Sep. 26, 2012 [Year: 2012], retrieved on [Jun. 20, 2021], retrieved from the internet <URL: https://dl.acm.org/doi/pdf/10.5555/2442691.2442741>, pp. 214-220.
(Continued)

*Primary Examiner* — Quochien B Vuong
(74) *Attorney, Agent, or Firm* — Sheppard, Mullin, Richter & Hampton LLP

(57) ABSTRACT

An interference detection system comprises memory storing computer instructions to cause a processor to perform gathering a temporal snapshot of radio parameter values associated with a first site of a point-to-point radio system, the radio parameter values including at least a receive signal level (RSL) value and at least one other radio parameter value correlated with signal degradation; determining whether the RSL value is greater than an RSL threshold; determining whether the other radio parameter value indicates a threshold level of signal degradation; when the RSL is greater than the RSL threshold and the other parameter indicates a threshold level of signal degradation during the temporal snapshot, determining that external interference is present during the temporal snapshot; when the RSL is not greater than the RSL threshold, determining that the external interference is not present; and performing a responsive action to a determination of the external interference being likely present.

26 Claims, 12 Drawing Sheets

Related U.S. Application Data

(60) Provisional application No. 63/007,526, filed on Apr. 9, 2020.

(58) Field of Classification Search
CPC .... H04B 17/20; H04B 17/318; H04B 17/309; H04B 17/336; H04B 17/345; H04W 24/02; H04W 24/08; H04W 28/0236; H04W 36/305; H04W 40/16; H04W 52/20; H04W 52/245; H04W 52/34; H04W 72/082; H04W 72/085
See application file for complete search history.

(56) References Cited

U.S. PATENT DOCUMENTS

| | | | |
|---|---|---|---|
| 8,830,818 | B2 | 9/2014 | Damnjanovic |
| 9,124,397 | B2 | 9/2015 | Lee et al. |
| 10,536,956 | B2 * | 1/2020 | Wang ................ H04W 72/10 |
| 10,666,337 | B2 | 5/2020 | Miyamoto et al. |
| 10,798,715 | B2 | 10/2020 | Sturkovich et al. |
| 2007/0054683 | A1 * | 3/2007 | Hansen ............... H04W 16/10 |
| | | | 455/62 |
| 2010/0322185 | A1 | 12/2010 | Park et al. |
| 2011/0053588 | A1 | 3/2011 | Al-Khudairi et al. |
| 2014/0162688 | A1 | 6/2014 | Edge |
| 2015/0341840 | A1 | 11/2015 | Lee et al. |
| 2015/0347959 | A1 | 12/2015 | Skaaksrud |
| 2018/0014265 | A1 | 1/2018 | Deng et al. |

OTHER PUBLICATIONS

International Application No. PCT/US2021/026489, International Search Report and Written Opinion dated Jul. 16, 2021, 6 pages.

* cited by examiner

SYSTEMS AND METHODS FOR IN-LINE INTERFERENCE DETECTION IN POINT-TO-POINT RADIO LINKS

PRIORITY CLAIM

This is a continuation application of U.S. Nonprovisional application Ser. No. 17/180,248, filed on Feb. 19, 2021, entitled "Systems And Methods For In-Line Interference Detection In Point-To-Point Radio Links," which claims benefit of U.S. Provisional Patent Application Ser. No. 63/007,526, entitled "In-Line Interference Detection Methods in Point-to-Point Microwave Links," filed on Apr. 9, 2020, by inventors Gary Croke, Sergio Licardie, Robert Vilhar, Sreco Plevel and Marius Koegelenberg, all of which are hereby incorporated by reference.

TECHNICAL FIELD

This invention relates generally to point-to-point radio links, and more particularly provides systems and methods for in-line interference detection in point-to-point radio links.

BACKGROUND

Radio signal interference involves the presence of unwanted radio signals that degrade, obstruct or interrupt a radio communication service. There are many types of interference (co-channel, adjacent channel, steady, bursty, regular, irregular, etc.) and many levels at which interference can be present (strong, moderate, weak). There are also many different conditions that could lead to interference. Some of them are completely intentional and expected (unlicensed bands) and some are involuntary and unpredictable (effects of multipath).

SUMMARY

Some embodiments of the invention perform in-line interference monitoring in point-to-point (PTP) radio links. Being able to accurately determine if interference is affecting a PTP radio link is important to identify problems and improve performance. Some embodiments may operate while the PTP radio link is online and without having to stop ongoing payload transport.

Some embodiments may apply to any of the microwave frequencies available for wireless data transport in the United States and internationally. Some systems may be particularly useful for licensed users of the 6 GHz frequency band in the United States where the Federal Communications Commission (FCC) has decided to allow unlicensed use of the band for operations relying on WiFi and other technical standards. The FCC proposes to allow unlicensed use in the 5.925-7.125 GHz (6 GHz) band while ensuring that the licensed services operating in this spectrum will continue to operate seamlessly. Accordingly, some systems may allow for licensed operators to determine if their radio links are being affected by interference and may generate reports to inform regulatory authorities.

Interference may be present at different severity levels. In some embodiments, including:

1. Link-disrupting interference—when the radio link is lost.
2. Error-generating interference—when the radio link is taking errors.
3. Performance-affecting interference—when the radio link is stressed due to interference, causing modulation changes, power adjustments and/or link availability reduction, but below the point of causing errors. This type of interference usually goes unnoticed.
4. Negligible or no interference.

Each of the different severity levels may have different impacts on the communication path. Note the example impacts below.

1. Link-disrupting interference—When the radio link is lost, regardless of cause, all traffic on the radio link must be rerouted over a different path or over a different media. If such options are unavailable, the area served by the radio link will have a communications outage (loss of service) while the radio link is down. Rerouting traffic may cause congestion in other parts of the network, longer latency, higher packet delay variation and/or potential loss of traffic especially in lower priority services. A communications outage, depending on the type of network, can cause revenue loss, loss of mission critical services, energy grid blackouts, synchronization loss, etc.
2. Error-generating interference—Radio link errors may cause packet re-transmission for some services and, depending on the severity, can cause congestion and inherently additional packet loss. Retransmissions may lead to latency and packet delay variation problems.
3. Performance-affecting interference—When the radio link has degraded but not to a level sufficient to cause errors, the following effects may be noticed based on the circumstances:
   a. If the radio link has ATPC and ACM enabled, these features may compensate for the degradation. ATPC increases the output power in the far end transmitter to try to bring the SNR to the expected nominal value. Operating at a higher output power may cause additional interference in the surrounding area. If a higher output power is maintained over a long period of time, the higher power can reduce product life. ACM downshifts coding and/or modulation to compensate for the degradation. Downshifting causes a reduction in link capacity and may cause congestion leading to higher latency and packet delay variation in some services and potential traffic loss in others.
   b. When the radio link has degraded but insufficiently to trigger a compensation action and/or the compensation mechanisms are not enabled, the interference may reduce the fade margin of the radio link and may cause the radio link to have lower availability. Thus, the radio link may be more susceptible to fail when other conditions arise, because the radio link will have insufficient means to compensate for the added impairments. When this happens, the link may be pushed prematurely into cases 1 and 2 above.

When interference is degrading a radio link, systems may respond by performing any or all of the following:

1. Document the event with all the pertinent information that led to the interference detection.
2. Based on the severity level, corrective actions may include any combination of:
   a. Increase the output power or turn on ATPC for automatic operation.
   b. Operate in a more robust code modulation or turn on ACM for automatic operation.
   c. Move to a larger antenna size.
   d. Use a diversity partner.

e. Adjust receiver equalizer coefficients to improve the quality of the received signal.
f. Operate the link in a different polarization.
g. Convert the link from non-space diversity to space diversity.
h. Migrate the radio link to a different frequency channel.

3. Raise an alarm and seek support to resolve the issue.

Some responses may be available only if the system is configured to execute them, e.g., if the link has Adaptive Code Modulation (ACM) enabled, if the link has Automatic Transmit Power Control (ATPC) enabled, and/or the like.

In some embodiments, systems may use parameters present in the radio modem and/or in the radio frequency unit (RFU) to determine when an external interferer is or may be present in the path. Systems may also use these parameters to validate the interference and/or discriminate among the different interference types.

In some embodiments, systems may determine that interference is affecting the radio link regardless of the source type causing it and regardless of whether the interfering signal is steady or bursty, regular or irregular, and/or caused by a time-division duplexing (TDD) or frequency-division duplexing (FDD) signal. Systems may discriminate between multipath conditions (and other electromagnetic propagation conditions) and external interference and may filter out false positive interference detections.

In some embodiments, systems may record the interference conditions when interference is detected in a historical database. Systems may use the historical database to augment link-performance-over-time reports and as a reference for future events. Systems can use the historical database to assist in detecting interference and to assist in evaluating events by creating a link operation baseline. In some embodiments, radio link baselining may be performed in a period when no interference is observed and when the radio link is not being subjected to fading and/or multipath conditions. Baselining may serve as a reference in the interference analysis and may be a fundamental element to determine the thresholds applied.

In some embodiments, systems may differentiate between situations where the radio signal is degraded by interferer signals and degradation caused by naturally occurring phenomena, equipment malfunction, installation problems, etc. Some causes of signal degradation can be addressed in a procedural way. For example, during the initial link setup, it is expected that the installation team will confirm that the radio equipment is operating within expected performance parameters designated for the radio link and will perform and record a number of tests that can be used as documented proof that the installation was performed correctly. This may include monitoring for the presence of unwanted radio signals in the channel that will be occupied by the carrier being setup and also in the adjacent channels. The reports generated during installation may also be used in operation baselining and/or in showing how the radio link was operating immediately after installation.

As noted above, radio link performance degradation may be caused by naturally occurring phenomena, like rain. Rain causes a weaker signal to be received by the receiver on the other end of the radio link due to the higher level of radiated signal absorption of water compared to air. This reduction in signal strength is normally referred to as radio link fading. In the case of radio link fading, the signal present at the receiver antenna port has been reduced by the attenuating effects of the fading condition. Systems may try to compensate for radio link performance degradation by, for example, (1) using gain control stages in the receiver chain, (2) switching to a stronger modulation/coding scheme (if ACM is enabled), and/or (3) causing the far end transmitter to increase its output power (if ATPC is enabled). In some cases, the fading condition can be so severe that it leads to errors in the radio link or losing the entire radio link all together.

In some embodiments, systems may look at radio parameters to assist in differentiating between external interference and other conditions causing link degradation. Under normal circumstances, when external interference is present, the Received Signal Level (RSL) may remain strong while other link performance parameters show signal degradation effects. In the other link degradation situations, the Received Signal Level (RSL) often degrades along with the other link performance parameters.

Focusing on external interference, systems may review radio parameters present in the radio modem and in the radio frequency unit to determine when an external interferer is or may be present in the path. In some embodiments, systems may evaluate the Received Signal Level (RSL), the Signal-to-Noise Ratio (SNR), the Demodulator-Not-Locked alarm (DNL), the Errored Seconds (ES) and Severely Errored Seconds (SES) performance indicators, the Uncoded Bit Error Rate (U-BER), the Adaptive Coding and Modulation (ACM) indicators, Automatic Power Control (ATPC) adjustments, fade margin reduction, and/or Equalizer Coefficients. In some embodiments, systems may use one, some or all of these parameters to assist in determining whether one or more external interferers are present and affecting the radio link and/or to determine the severity level and the conditions that they produce.

The main overall considerations for interference detection involve primarily a good Received Signal Level (RSL) and a bad Signal to Noise Ratio (SNR). However, there are a number of conditions where the SNR may not be bad enough to create evident effects (like errors, alarms, Demodulator Not Locked (DNL)), but still degrade the radio link enough to cause reductions in capacity due to a downshift in modulation/coding (e.g., ACM) and/or increase in the far end output power to compensate for the SNR reduction (e.g., ATPC). Even further, the radio link may be operating with a reduced fade margin that may cause a lower link availability and therefore may be more susceptible to link failure.

Embodiments of the present invention provide an interference detection system in a point-to-point radio system, the point-to-point radio system including a first site in radio communication with a second site, comprising at least one processor; and memory storing computer instructions, the computer instructions when executed by the at least one processor causing the system to perform, gathering a temporal snapshot of radio parameter values associated with at least a first site of a point-to-point radio system, the radio parameter values including at least a receive signal level (RSL) value and at least one other radio parameter value correlated with signal degradation during the temporal snapshot; determining whether the RSL value is greater than an RSL threshold; determining whether the other radio parameter value indicates a threshold level of signal degradation during the temporal snapshot; at least when the RSL is greater than the RSL threshold and the other parameter indicates a threshold level of signal degradation during the temporal snapshot, then determining that external interference is likely present during the temporal snapshot; at least when the RSL is not greater than the RSL threshold, then determining that the external interference is likely not present during the temporal snapshot; and performing a responsive action to a determination of the external interference being likely present during the temporal snapshot.

The radio parameter values may include radio parameter values associated with a modem and a radio frequency unit at the first site during the temporal snapshot. The other radio parameter value may include a Demodulator Not Locked (DNL) Alarm, and the other radio parameter value may indicate a threshold level of signal degradation at least when the DNL Alarm is active. The other radio parameter value may include Errored Seconds (ES) or Severely Errored Seconds (SES) value, and the other radio parameter value may indicate a threshold level of signal degradation at least when the ES or SES value is increasing from a previous sample. The other radio parameter value may include a signal-to-noise ratio (SNR) value, and the other radio parameter value may indicate a threshold level of signal degradation at least when at least the SNR value is less than a threshold. The other radio parameter value may include a change in an Uncoded Bit Error Rate (U-BER), and the other radio parameter value may indicate a threshold level of signal degradation at least when the change in the U-BER is greater than a threshold. The other radio parameter may include Adaptive Code Modulation (ACM) data, and the other radio parameter value may indicate a threshold level of signal degradation at least when ACM is active and negative. The other radio parameter value may include Automatic Transmit Power Control (ATPC) data, and the other radio parameter value may indicate a threshold level of signal degradation at least when ATPC is enabled and a power adjustment is greater than a threshold.

The computer instructions when executed by the processor may further cause the system to perform evaluating interference persistence; and determining a false positive at least when the interference persistence is less than a minimum threshold duration.

The computer instructions when executed by the processor may further cause the system to perform determining an amount of interference variation; identifying the external interference as a steady interferer at least when the amount of interference variation is less than a threshold; and identifying the external interference as a continuous bursty interferer at least when the amount of interference variation is greater than the threshold.

The computer instructions when executed by the processor may further cause the system to perform determining first interference effects on a first receiver at the first site in space diversity with a second receiver at the first site; determining second interference effects on the second receiver at the first site; comparing the first interference effects with the second interference effects; and at least when the first interference effects are substantially the same as the second interference effects, then validating the external interference.

The computer instructions when executed by the processor may further cause the system to perform determining first SNR on a first receiver at the first site in space diversity with a second receiver at the first site; determining second SNR on the second receiver; at least when the first SNR indicates signal degradation while the second SNR does not indicate signal degradation and when thereafter the first SNR improves or clears while the second SNR deteriorates, then identifying the external interference as a likely multipath interference.

The computer instructions when executed by the processor may further cause the system to perform comparing a near-end interference condition with a far-end interference condition; and at least when the near-end interference condition is not substantially similar to the far-end interference condition, the validating the external interference.

The computer instructions when executed by the processor may further cause the system to perform searching a historical database for records indicative of an interference pattern or correlation with external events; and using the interference pattern or correlation with external events to assist in identifying future interferences as not being due to an external interferer.

The computer instructions when executed by the processor may further cause the system to perform gathering a bin of radio parameter information, the bin of radio parameter information including maximum and minimum levels of RSL values and at least one other radio parameter values occurring during a specific time period; and evaluating the bin of radio parameter information to determine a likelihood of the external interference occurring in any temporal snapshot within the specific time period, before performing an analysis of any temporal snapshot of radio parameter values within the specific time period. The specific time period may include a 15-minute time period.

Embodiments of the present invention may provide an interference detection method in a point-to-point radio system, the point-to-point radio system including a first site in radio communication with a second site, comprising: gathering a temporal snapshot of radio parameter values associated with at least a first site of a point-to-point radio system, the radio parameter values including at least a receive signal level (RSL) value and at least one other radio parameter value correlated with signal degradation during the temporal snapshot; determining whether the RSL value is greater than an RSL threshold; determining whether the other radio parameter value indicates a threshold level of signal degradation during the temporal snapshot; at least when the RSL is greater than the RSL threshold and the other parameter indicates a threshold level of signal degradation during the temporal snapshot, then determining that external interference is likely present during the temporal snapshot; at least when the RSL is not greater than the RSL threshold, then determining that the external interference is likely not present during the temporal snapshot; and performing a responsive action to a determination of the external interference being likely present during the temporal snapshot.

The interference detection method may further comprise evaluating interference persistence; and determining a false positive at least when the interference persistence is less than a minimum threshold duration.

The interference detection method may further comprise determining an amount of interference variation; identifying the external interference as a steady interferer at least when the amount of interference variation is less than a threshold; and identifying the external interference as a continuous bursty interferer at least when the amount of interference variation is greater than the threshold.

The interference detection method may further comprise determining first interference effects on a first receiver at the first site in space diversity with a second receiver at the first site; determining second interference effects on the second receiver at the first site; comparing the first interference effects with the second interference effects; and at least when the first interference effects are substantially the same as the second interference effects, then validating the external interference.

The interference detection method may further comprise determining first SNR on a first receiver at the first site in space diversity with a second receiver at the first site;

determining second SNR on the second receiver; and at least when the first SNR indicates signal degradation while the second SNR does not indicate signal degradation and when thereafter the first SNR improves or clears while the second SNR deteriorates, then identifying the external interference as a likely multipath interference.

The interference detection method may further comprise comparing a near-end interference condition with a far-end interference condition; and at least when the near-end interference condition is not substantially similar to the far-end interference condition, the validating the external interference.

The interference detection method may further comprise searching a historical database for records indicative of an interference pattern or correlation with external events; and using the interference pattern or correlation with external events to assist in identifying future interferences as not being due to an external interferer.

The interference detection method may further comprise gathering a bin of radio parameter information, the bin of radio parameter information including maximum and minimum levels of RSL values and at least one other radio parameter values occurring during a specific time period; and evaluating the bin of radio parameter information to determine a likelihood of the external interference occurring in any temporal snapshot within the specific time period, before performing an analysis of any temporal snapshot of radio parameter values within the specific time period.

DETAILED DESCRIPTION

Figure 1:
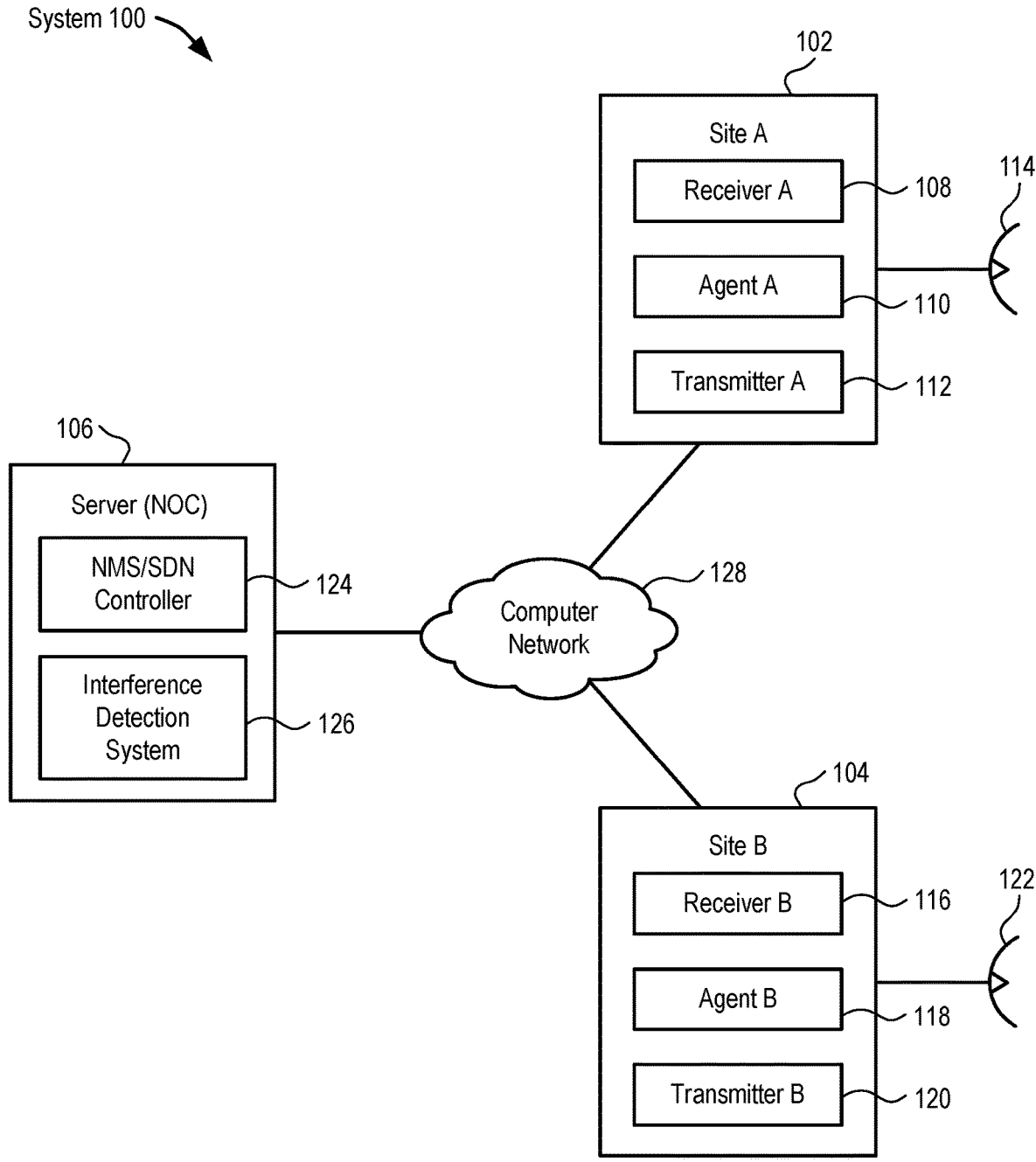
FIG. 1 is a diagram of a point-to-point radio system, in accordance with some embodiments of the present invention.

The following description is provided to enable a person skilled in the art to make and use various embodiments of the invention. Modifications are possible. The generic principles defined herein may be applied to the described and other embodiments without departing from the spirit and scope of the invention. Thus, the claims are not intended to be limited to the embodiments disclosed, but are to be accorded the widest scope consistent with the principles, features and teachings herein.

Some embodiments of the invention perform in-line interference monitoring in point-to-point (PTP) radio links. Being able to accurately determine if interference is affecting a PTP radio link is important to identify problems and improve performance. Some embodiments may operate while the PTP radio link is online and without having to stop ongoing payload transport.

Some embodiments may apply to any of the microwave frequencies available for wireless data transport in the United States and internationally. Some systems may be particularly useful for licensed users of the 6 GHz frequency band in the United States where the Federal Communications Commission (FCC) has decided to allow unlicensed use of the band for operations relying on WiFi and other technical standards. The FCC proposes to allow unlicensed use in the 5.925-7.125 GHz (6 GHz) band while ensuring that the licensed services operating in this spectrum will continue to operate seamlessly. Accordingly, some systems may allow for licensed operators to determine if their radio links are being affected by interference and may generate reports to inform regulatory authorities.

Interference may be present at different severity levels. In some embodiments, including:

1. Link-disrupting interference—when the radio link is lost.
2. Error-generating interference—when the radio link is taking errors.
3. Performance-affecting interference—when the radio link is stressed due to interference, causing modulation changes, power adjustments and/or link availability reduction, but below the point of causing errors. This type of interference usually goes unnoticed.
4. Negligible or no interference.

Each of the different severity levels may have different impacts on the communication path. Note the example impacts below.

4. Link-disrupting interference—When the radio link is lost, regardless of cause, all traffic on the radio link must be rerouted over a different path or over a different media. If such options are unavailable, the area served by the radio link will have a communications outage (loss of service) while the radio link is down. Re-routing traffic may cause congestion in other parts of the network, longer latency, higher packet delay variation and/or potential loss of traffic especially in lower priority services. A communications outage, depending on the type of network, can cause revenue loss, loss of mission critical services, energy grid blackouts, synchronization loss, etc.
5. Error-generating interference—Radio link errors may cause packet re-transmission for some services and, depending on the severity, can cause congestion and inherently additional packet loss. Retransmissions may lead to latency and packet delay variation problems.

6. Performance-affecting interference—When the radio link has degraded but not to a level sufficient to cause errors, the following effects may be noticed based on the circumstances:
   a. If the radio link has ATPC and ACM enabled, these features may compensate for the degradation. ATPC increases the output power in the far end transmitter to try to bring the SNR to the expected nominal value. Operating at a higher output power may cause additional interference in the surrounding area. If a higher output power is maintained over a long period of time, the higher power can reduce product life. ACM downshifts coding and/or modulation to compensate for the degradation. Downshifting causes a reduction in link capacity and may cause congestion leading to higher latency and packet delay variation in some services and potential traffic loss in others.
   b. When the radio link has degraded but insufficiently to trigger a compensation action and/or the compensation mechanisms are not enabled, the interference may reduce the fade margin of the radio link and may cause the radio link to have lower availability. Thus, the radio link may be more susceptible to fail when other conditions arise, because the radio link will have insufficient means to compensate for the added impairments. When this happens, the link may be pushed prematurely into cases 1 and 2 above.

When interference is degrading a radio link, systems may respond by performing any or all of the following:

4. Document the event with all the pertinent information that led to the interference detection.
5. Based on the severity level, corrective actions may include any combination of:
   a. Increase the output power or turn on ATPC for automatic operation.
   b. Operate in a more robust code modulation or turn on ACM for automatic operation.
   c. Move to a larger antenna size.
   d. Use a diversity partner.
   e. Adjust receiver equalizer coefficients to improve the quality of the received signal.
   f. Operate the link in a different polarization.
   g. Convert the link from non-space diversity to space diversity.
   h. Migrate the radio link to a different frequency channel.
6. Raise an alarm and seek support to resolve the issue.

Some responses may be available only if the system is configured to execute them, e.g., if the link has Adaptive Code Modulation (ACM) enabled, if the link has Automatic Transmit Power Control (ATPC) enabled, and/or the like.

In some embodiments, systems may use parameters present in the radio modem and/or in the radio frequency unit (RFU) to determine when an external interferer is or may be present in the path. Systems may also use these parameters to validate the interference and/or discriminate among the different interference types.

In some embodiments, systems may determine that interference is affecting the radio link regardless of the source type causing it and regardless of whether the interfering signal is steady or bursty, regular or irregular, and/or caused by a time-division duplexing (TDD) or frequency-division duplexing (FDD) signal. Systems may discriminate between multipath conditions (and other electromagnetic propagation conditions) and external interference and may filter out false positive interference detections.

In some embodiments, systems may record the interference conditions when interference is detected in a historical database. Systems may use the historical database to augment link-performance-over-time reports and as a reference for future events. Systems can use the historical database to assist in detecting interference and to assist in evaluating events by creating a link operation baseline. In some embodiments, radio link baselining may be performed in a period when no interference is observed and when the radio link is not being subjected to fading and/or multipath conditions. Baselining may serve as a reference in the interference analysis and may be a fundamental element to determine the thresholds applied.

In some embodiments, systems may differentiate between situations where the radio signal is degraded by interferer signals and degradation caused by naturally occurring phenomena, equipment malfunction, installation problems, etc. Some causes of signal degradation can be addressed in a procedural way. For example, during the initial link setup, it is expected that the installation team will confirm that the radio equipment is operating within expected performance parameters designated for the radio link and will perform and record a number of tests that can be used as documented proof that the installation was performed correctly. This may include monitoring for the presence of unwanted radio signals in the channel that will be occupied by the carrier being setup and also in the adjacent channels. The reports generated during installation may also be used in operation baselining and/or in showing how the radio link was operating immediately after installation.

As noted above, radio link performance degradation may be caused by naturally occurring phenomena, like rain. Rain causes a weaker signal to be received by the receiver on the other end of the radio link due to the higher level of radiated signal absorption of water compared to air. This reduction in signal strength is normally referred to as radio link fading. In the case of radio link fading, the signal present at the receiver antenna port has been reduced by the attenuating effects of the fading condition. Systems may try to compensate for radio link performance degradation by, for example, (1) using gain control stages in the receiver chain, (2) switching to a stronger modulation/coding scheme (if ACM is enabled), and/or (3) causing the far end transmitter to increase its output power (if ATPC is enabled). In some cases, the fading condition can be so severe that it leads to errors in the radio link or losing the entire radio link all together.

In some embodiments, systems may look at radio parameters to assist in differentiating between external interference and other conditions causing link degradation. Under normal circumstances, when external interference is present, the Received Signal Level (RSL) may remain strong while other link performance parameters show signal degradation effects. In the other link degradation situations, the Received Signal Level (RSL) often degrades along with the other link performance parameters.

Focusing on external interference, systems may review radio parameters present in the radio modem and in the radio frequency unit to determine when an external interferer is or may be present in the path. In some embodiments, systems may evaluate the Received Signal Level (RSL), the Signal-to-Noise Ratio (SNR), the Demodulator-Not-Locked alarm (DNL), the Errored Seconds (ES) and Severely Errored Seconds (SES) performance indicators, the Uncoded Bit Error Rate (U-BER), the Adaptive Coding and Modulation (ACM) indicators, Automatic Power Control (ATPC) adjustments, fade margin reduction, and/or Equalizer Coefficients. In some embodiments, systems may use one, some or all of these parameters to assist in determining whether one or more external interferers are present and affecting the radio link and/or to determine the severity level and the conditions that they produce.

In the table below, principles for external interferer detection and the effects that they may cause are shown. As noted, the main overall considerations for interference detection involve primarily a good Received Signal Level (RSL) and a bad Signal to Noise Ratio (SNR). However, there are a number of conditions where the SNR may not be bad enough to create evident effects (like errors, alarms, Demodulator Not Locked (DNL)), but still degrade the radio link enough to cause reductions in capacity due to a downshift in modulation/coding (e.g., ACM) and/or increase in the far end output power to compensate for the SNR reduction (e.g., ATPC). Even further, the radio link may be operating with a reduced fade margin that may cause a lower link availability and therefore may be more susceptible to link failure.

| SNR | Alarm/ Failure | ATPC/ACM | RSL | Interference |
| --- | --- | --- | --- | --- |
| Low | DNL | Both if enabled | Good | Yes |
| Low | Errored Seconds | Both if enabled | Good | Yes |
| Moderately Low | None | Power raised FE Modulation drop NE | Good | Maybe/Likely |
| Slightly Low | None | No Change or not enabled. Use U-BER | Good | Maybe |

FIG. 1 is a diagram of a point-to-point (PTP) radio system 100, in accordance with some embodiments of the present invention. The PTP radio system 100 includes a first site (site A) 102 in radio communication (e.g., microwave and/or millimeter wave communication) with a second site (site B) 104. Each of the first site 102 and the second site 104 are coupled via a computer network 128 (e.g., wired and/or wireless) to a server 106 (which may be located at or part of a network operations center (NOC)).

The first site 102 includes a first receiver (receiver A) 108, a first agent (agent A) 110, a first transmitter (transmitter A) 112, and a first antenna 114. The first receiver 108 includes circuitry to receive signals via the first antenna 114 from the second site 104. The first transmitter 112 includes circuitry to transmit signals to the first antenna 114 for delivery to the second site 104. Although shown as singular, the first site 102 may have any number of first receivers 108, any number of first transmitters 112, and any numbers of first antennas 114. The first agent 110 operates to gather parameters associated with the first receiver 108 and/or the first transmitter 112 (and/or possibly from the second receiver 116 and/or the second transmitter 120), which it may provide to the NMS 124 for system monitoring. The first agent 110 may also operate to receive configuration information and/or instructions to configure the first site 102 (e.g., the first receiver 108 and/or the first transmitter 112) based on interferences detected.

The second site 104 includes a second receiver (receiver B) 116, a second agent (agent A) 118, a second transmitter (transmitter A) 120, and a second antenna 122. The second receiver 116 includes circuitry to receive signals via the second antenna 122 from the first site 102. The second transmitter 120 includes circuitry to transmit signals to the second antenna 122 for delivery to the first site 102. Although shown as singular, the second site 104 may have any number of second receivers 116, any number of second transmitters 120, and any numbers of second antennas 122. The second agent 118 operates to gather parameters associated with the second receiver 116 and/or the second transmitter 120 (and/or possibly the first receiver 108 and/or the first transmitter 112), which it may provide to the NMS 124 for system monitoring. The second agent 118 may also operate to receive configuration information and/or instructions to configure the second site 104 (e.g., the second receiver 116 and/or the second transmitter 120) based on interferences detected.

The server 106 includes a network management/monitoring system (NMS) or Software-Defined Networking (SDN) controller 124, referred to herein as NMS 124. The server 106 further includes an interference detection system 126. The NMS 124 may include hardware, software and/or firmware configured to evaluate parameters received from network agents, e.g., from the first agent 110 and/or the second agent 118. The interference detection system 126 may include hardware, software and/or firmware configured to evaluate parameters from the NMS 126 to identify external interference, determine the severity level of the interference, validate/classify the interference, identify false positives, and/or the like. Although shown as located on the server 106, the interference detection system 126 can be located anywhere in the network, including at a site or distributed among several sites.

Figure 2:
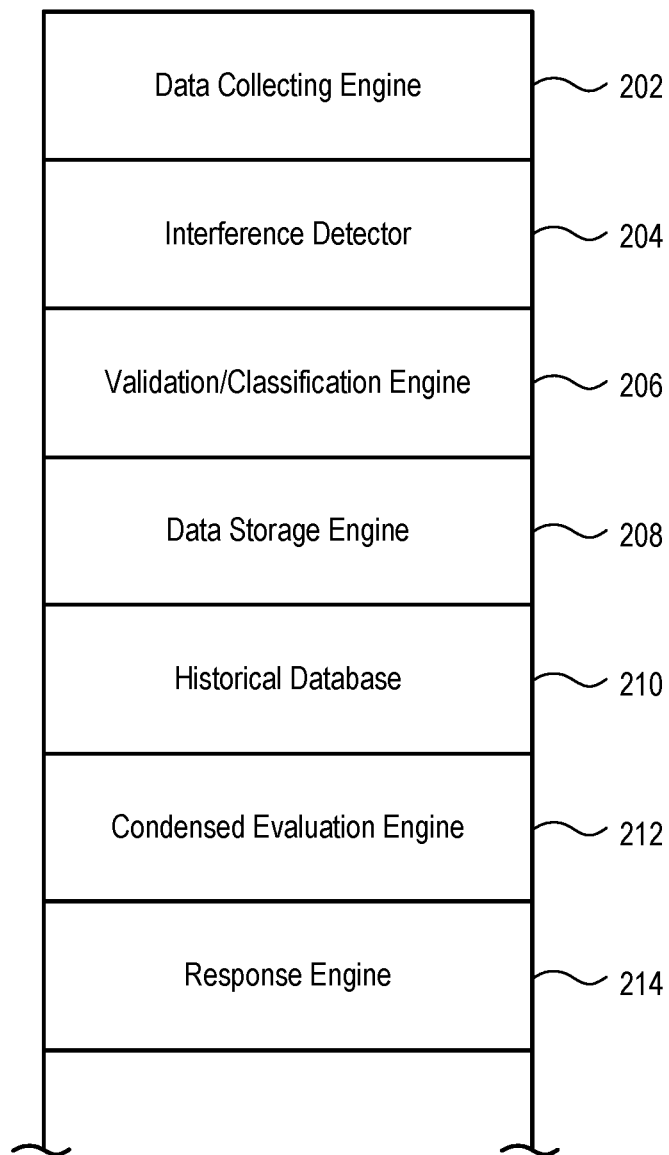
FIG. 2 is a diagram illustrating details of the interference detection system of FIG. 1, in accordance with some embodiments of the present invention.

FIG. 2 is a diagram illustrating details of the interference detection system 126, in accordance with some embodiments of the present invention. The interference detection system 126 includes a data collecting engine 202, an interference detector 204, a validation/classification engine 206, a data storage engine 208, a historical database 210, a condensed evaluation engine 212, and a response engine 214.

In some embodiments, the data collecting engine 202 includes hardware, software and/or firmware configured to gather radio parameters present in the radio modem and/or in the radio frequency unit (RFU). In some embodiments, the data collecting engine 202 gathers the radio parameters from the NMS 124. In some embodiments, the data collecting engine 202 may gather the radio parameters by communicating directly with the agents at the various sites, e.g., with the first agent 110 and the second agent 118. The data collecting engine 202 may cooperate with the data storage engine 208 to store the radio parameters in the historical database 210.

In some embodiments, the data collecting engine 202 may gather radio parameters corresponding to "temporal snapshots". That is, the data collecting engine 202 may gather the radio parameters of tight windows of time, to ensure that the radio parameters correlate with each other and correlate in time to interference that may be caused by an external interferer (e.g., ±5 msec tolerance).

In some embodiments, the interference detector 204 includes hardware, software and/or firmware configured to evaluate the radio parameters to assist in identifying potential external interference, as opposed to the other conditions that may cause link degradation. The interference detector 204 may look at whether the Received Signal Level (RSL) remains strong while other link performance parameters show degradation effects (suggestive of an external interference), or whether the RSL degraded along with the other link performance parameters (suggestive of a non-interference type degradation).

The interference detector 204 may evaluate the Received Signal Level (RSL), the Signal-to-Noise Ratio (SNR), the Demodulator-Not-Locked alarm (DNL), the Errored Seconds (ES) and Severely Errored Seconds (SES) performance indicators, the Uncoded Bit Error Rate (Uncoded BER), the Adaptive Coding and Modulation indicators, Automatic Power Control (ATPC) adjustments, fade margin reduction, and/or Equalizer Coefficients. In some embodiments, the interference detector 204 may use one, some or all of these parameters to assist in determining whether one or more interferers are present and affecting the radio link.

The interference detector 204 may evaluate data generated during installation to support operation baselining, thereby supporting the generation of the various thresholds used herein and described in more detail below.

The validation/classification engine 206 includes hardware, software and/or firmware configured to validate external interferer signal based on validation criteria, including persistence, multipath effects, symmetry, and historical records. The different validation methods are described in detail with reference to FIGS. 6-9.

The data storage engine 208 includes hardware, software and/or firmware configured to record in the historical database 210 the radio parameters and interference conditions when interference is detected. The interference detector 204, validation/classification engine 206 and/or condensed evaluation engine 212 may use the historical database 210 to assist in detecting interference and to assist in creating a link operation baseline. In some embodiments, baselining of the radio link may be performed in a period when no interference is observed and when the radio link is not being subjected to fading and/or multipath conditions, as operation baselining may serve as a reference in the interference analysis and may be a fundamental element to determine the thresholds applied in it. Further, the interference detection system 126 may be configured to augment link-performance-over-time reports and as a reference for future events.

The condensed evaluation engine 212 includes hardware, software and/or firmware configured to evaluate aggregated bins of radio parameters associated with a longer time period to assist in identifying a possibility of external interference in that time period, meriting a more detailed evaluation of the radio parameters associated with the temporal snapshots within the time period or a more detailed evaluation of the radio parameters associated with a real-time temporal snapshot.

The response engine 214 includes hardware, software and/or firmware configured to respond to the presence of interference. Some responses may involve generating and transmitting reports, setting off alarms, informing regulatory entities, modifying configurations, etc.

Figure 3A:
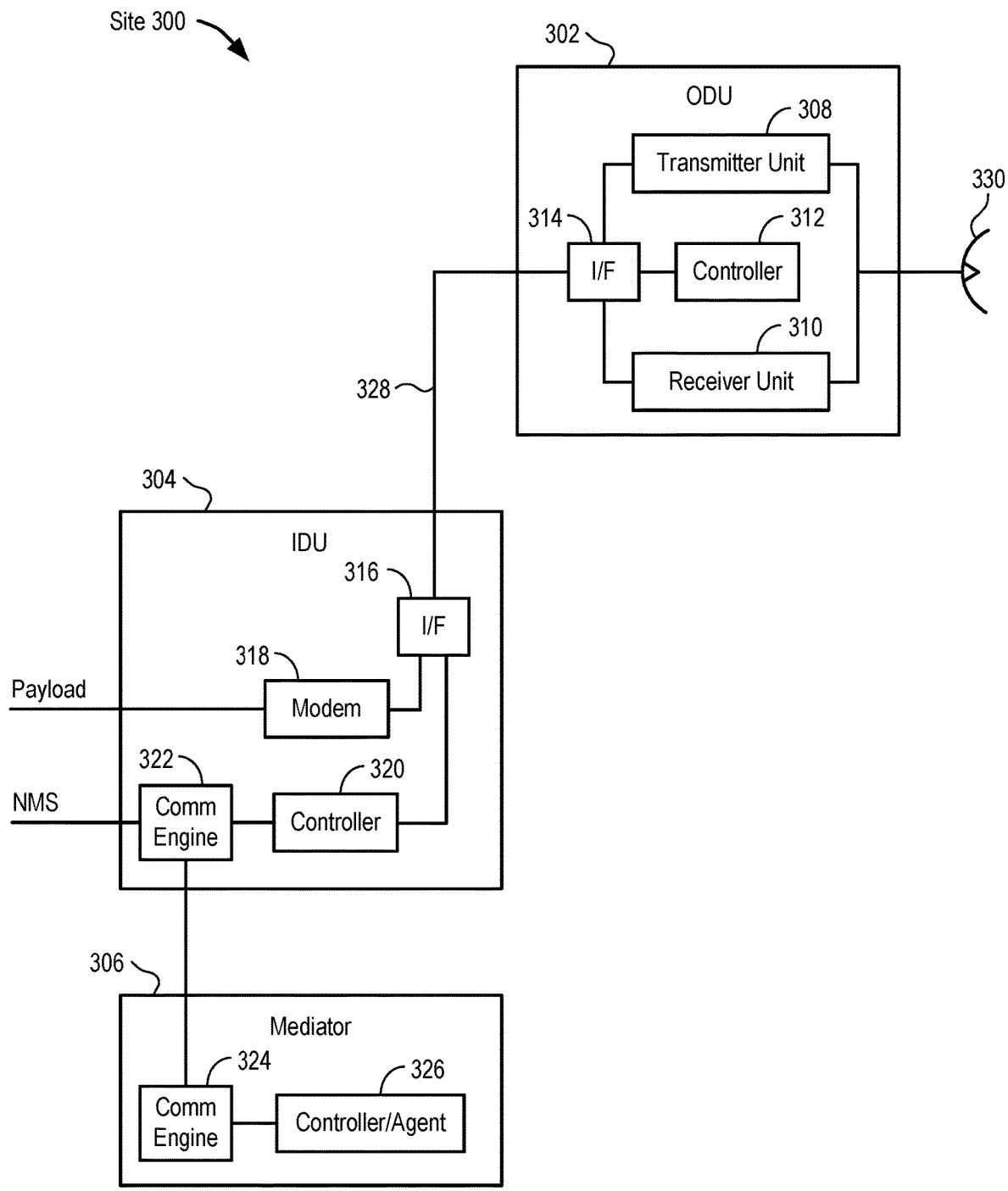
FIG. 3A is a diagram illustrating details of a site of FIG. 1, in accordance with some embodiments of the present invention.

FIG. 3A is a diagram illustrating details of a site 300, in accordance with some embodiments of the present invention. Site 300 may illustrate example details of the first site 102 and/or the second site 104.

Site 300 includes an outdoor unit (ODU) 302 coupled to the antenna 330 and over a communication link (e.g., coaxial cable) 328 to an indoor unit (IDU) 304, which is coupled to a mediator 306. Although shown as a split-mount architecture, embodiments are not limited to split-mount systems. Embodiments will work with all-indoor and/or all-outdoor systems. The ODU 302 includes a transmitter unit 308, a receiver unit 310 and a controller 312, each coupled to an ODU interface 314. The IDU 304 includes a modem 318 and a controller 320, each coupled to an IDU interface 316, which is coupled to the ODU interface 314. The IDU 304 further includes a communication engine 322 coupled to the controller 320 and coupled via the computer network 128 to the NMS 124. The mediator 306 includes a controller/agent 326 coupled to a communication engine 326, which is coupled to the communication engine 322 of the IDU 304.

In operation, payload is delivered to and from customer premise equipment (not shown). The modem 318 receives and modulates the outgoing payload and forwards it onto the communication link 328 to the ODU 302. The transmitter unit 308 in the ODU 302 forwards the outgoing payload to the antenna 330 for radio transport to the second site. Further, the antenna 330 receives incoming payload and forwards it to the receiver unit 310, which forwards it to the modem 318, which demodulates the incoming payload and forwards it to the customer premise equipment.

The controller 312, controller 320 and controller/agent 326 operate to gather radio parameters associated with the various components, including the modem 318, the transmitter unit 308 and the receiver unit 310. Further, the controller 312, controller 320 and controller/agent 326 operate to control the configuration settings of the components of the ODU 302 and IDU 304 (e.g., ACM, ATPC, etc.).

The communication engine 322 operates to transmit radio parameters to the NMS 124 and/or interference detection system 126.

In some embodiments, the mediator 306 may be a separate computing device that communicatively couples to the IDU 304 via the communication engine 322. Further, the controller/agent 326 may operate to assist in gathering and transmitting the radio parameters needed by the interference detection system 126 and to assist in managing any responsive actions by the site 300 to support management of interferences detected by the interference detection system 126.

Figure 3B:
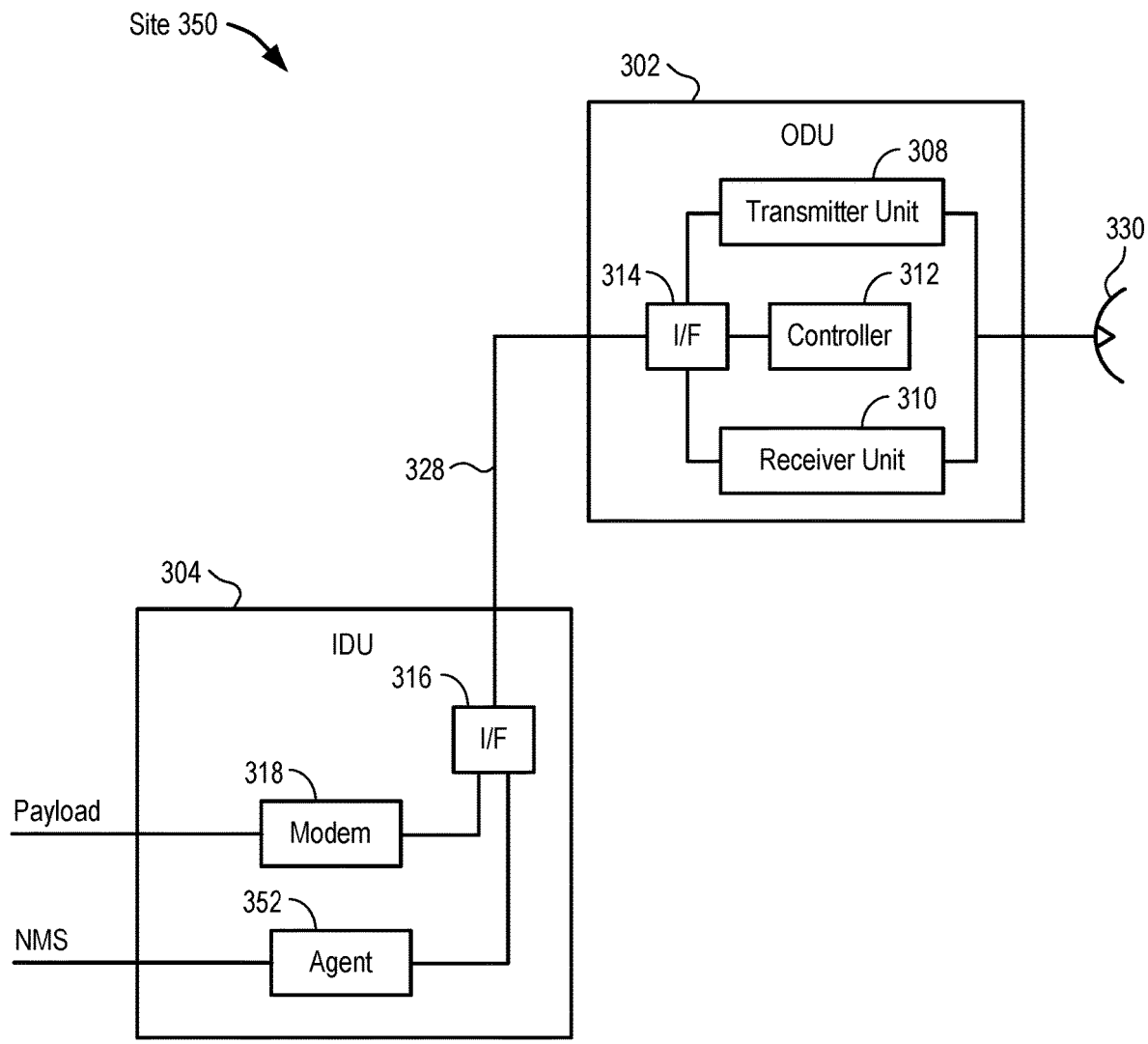
FIG. 3B is a diagram illustrating details of a site of FIG. 1, in accordance with some embodiments of the present invention.

FIG. 3B is a diagram illustrating details of a site 350, in accordance with some embodiments of the present invention. The elements of site 350 may be similar to the site 300, except that the functions of the mediator 306, the controller/agent 326, and the communication engines 322 and 324 may be wrapped into an agent 352 located in the IDU 304 in place of the controller 320.

Figure 4:
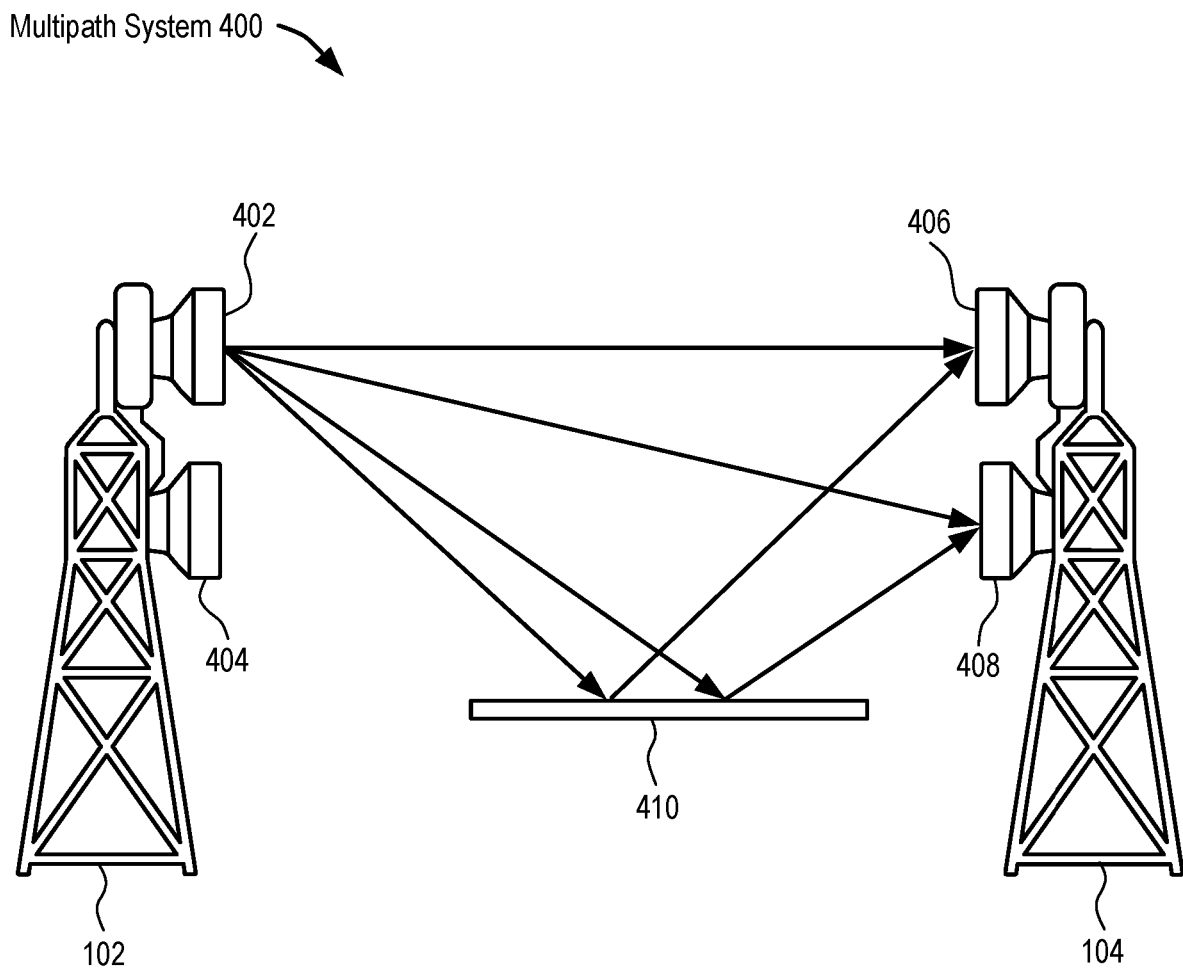
FIG. 4 shows a graphical representation of a point-to-point radio system implementing space diversity and having multipath effects.

FIG. 4 shows a graphical representation of PTP radio system 400 with multipath interference in a space diversity link, which may be a particular case of the PTP radio system 100. As shown, the PTP radio system 400 includes a first site 102 in communication over a radio channel with a second site 104. The first site 102 includes a first antenna system 402 (with a first transmitter and a first receiver, not shown) and a second antenna system 404 (with a second transmitter and a second receiver, not shown). The second site 104 includes a third antenna system 406 (with a third transmitter and a third receiver, not shown) and a fourth antenna system 408 (with a fourth transmitter and a fourth receiver, not shown). The first antenna system 402 at the first site 102 transmits a radio signal, which is being reflected off a reflection layer 410 and which is being received with multipath effects by each of the third antenna system 406 and the fourth antenna system 408.

As can be seen, the effects of multipath interference act similarly to that of an external interferer. However, the actions to be taken are likely considerably different. For this reason, in some embodiments, identifying interference events due to multipath effects may be a critical part of the interference detection algorithms. In some embodiments, multipath propagation may be particularly relevant in microwave frequencies below 13 GHz, where the multipath propagation phenomenon is more common.

Multipath interference is typically caused by the reflection of an originally transmitted signal off an elevated refractive layer (inversion layer), a water body and/or other terrestrial object such as mountains or buildings. Multipath interference can also be caused by atmospheric ducting and ionospheric reflection and refraction. Since the reflected signal arrives at a later time and out of phase with the originally transmitted signal (e.g., due to path distance), the reflected signal acts as an interferer and can have severe effects on the radio link.

In a space diversity context, as shown in FIG. 4, multipath interference may affect both the third and fourth receivers of the third and fourth antenna systems 406 and 408 in different ways and at different times, e.g., affecting the third receiver of the third antenna system 406 at a first time and the fourth receiver of the fourth antenna system 408 at as second later time. In the case of non-space diversity links, the detection of multipath interference may be more complicated and may require the validation/classification engine 206 to evaluate modem parameters, e.g., the receiver equalizer coefficients. The validation/classification engine 206 may also use the historical database 210 associated with the radio link to determine if an interference event is happening at regular intervals and/or whether this interference event is correlated to some specific naturally occurring phenomenon like tides, weather patterns, sunrise/sunset, etc. One of the characteristics of multipath interference is that it often has daily and/or seasonal patterns. The validation/classification engine 206 can use this information to assist in identifying a multipath type of interference.

Figure 5:
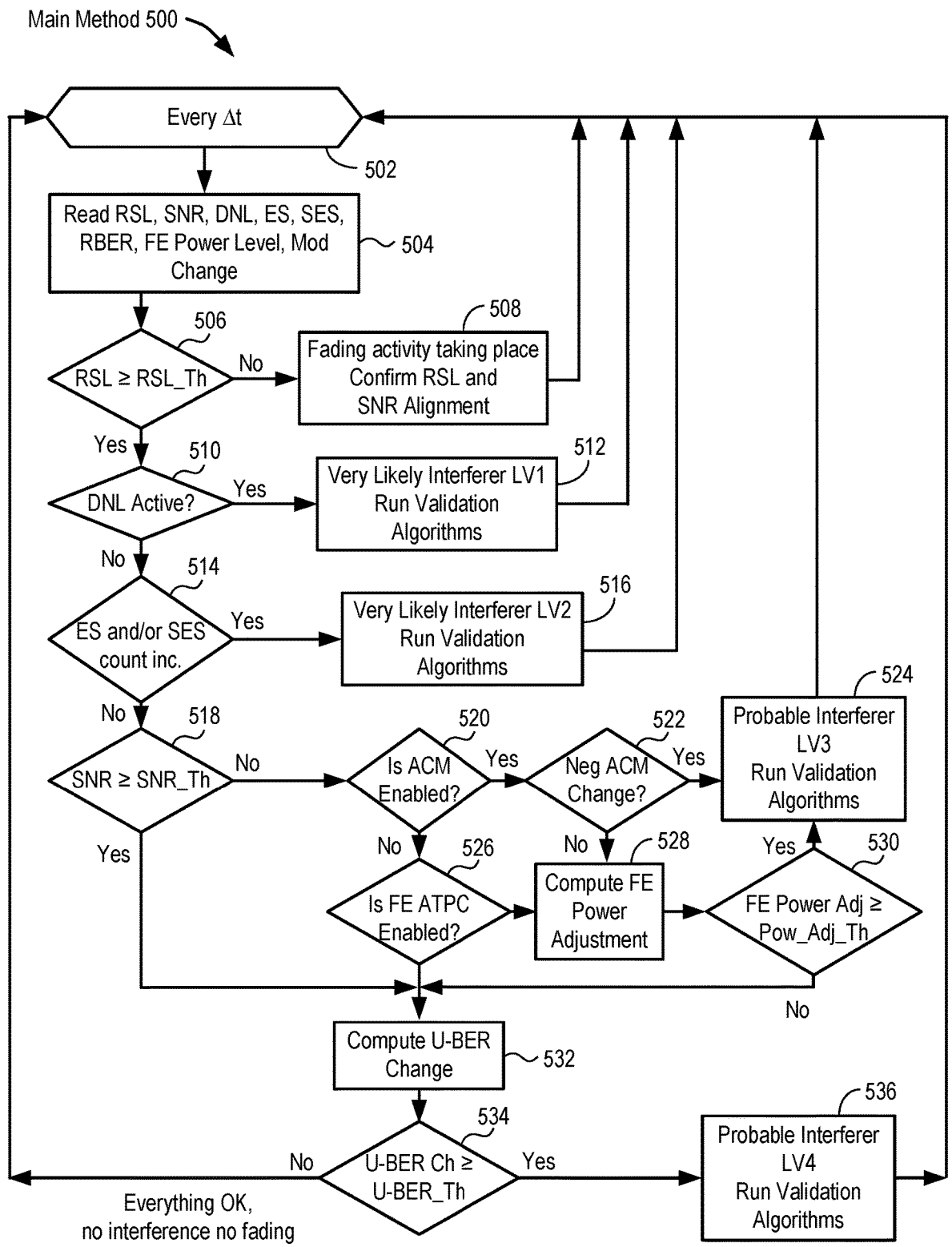
FIG. 5 is a flowchart illustrating a main method of evaluating interference in the point-to-point radio system of FIG. 1, in accordance with some embodiments of the present invention.

FIG. 5 is a flowchart illustrating a main method 500 of evaluating interference in the PTP system 100, in accordance with some embodiments of the present invention. In some embodiments, the main method 500 may be responsible for determining whether the microwave radio link is being affected by interference at any given point in time. The main method 500 may also be responsible for discriminating interference from fading and for initiating additional methods to conduct classification of the interference into different potential interference types.

In some embodiments, for the main method 500 to work correctly, in step 502, data is evaluated as a temporal snapshot. That is, all of the parameters that the interference detection system 126 uses to determine whether an interferer is present preferably have been captured at the same time (e.g., ±5 msec tolerance). This supports appropriate data correlation in the parameters representing the condition being evaluated at the particular instance of time.

As indicated herein, the interference detector 204 may determine the presence of interference when it identifies strong RSL present and the performance of the radio link shows signs of deterioration. In step 504, the data collecting engine 202 reads RSL, SNR, DNL, ES, SES, RBER, FE Power Level, Mod Change, and/or the like, for the given temporal snapshot. In step 506, the interference detector 204 determines, from the radio parameters collected, whether the RSL is strong enough. This may be established according to an RSL threshold based on the specific link conditions (link budget and baseline link performance, among others). In other words, the RSL threshold RSL_Th may be generated based on the expected RSL for that specific radio link, since many of the link characteristics vary from link to link, like the radio link separation (link distance), the type of antennas used, output power and other link parameters. Those will ultimately determine the expected RSL.

If in step 506 the interference detector 204 determines that the RSL is below the RSL threshold, the interference detector 204 in step 508 will consider the radio link to be under fading activity. In this situation, the interference detector 204 will verify if the fading is deep enough to affect the corresponding SNR or not. This information may be recorded by the data storage engine 208 in the historical database 210 as part of the historical record of the radio link. The interference detector 204 may not pursue the information further in the interference determination. The main method 500 will return to step 502 to evaluate the radio parameters from the next temporal snapshot.

If in step 506 the interference detector 204 determines that the RSL is equal or above the RSL threshold, then the interference detector 204 may determine that the first component of the interference detection (a strong RSL) has been met. In some embodiments, the interference detector 204 proceeds to determine if the radio link has deteriorated. The interference detector 204 may evaluate the different conditions that indicate link degradation in order of severity.

When the radio link has been lost due to interference, the DNL alarm would have been raised and the SNR would have dropped to 0.0. Since the DNL alarm may take slightly longer to raise due to external processing, the SNR turning to zero could be used instead. This type of interference is explicit and noticeable. Accordingly, in step 510, the interference detector 204 determines whether the DNL alarm is active. If so, then the interference detector 204 in step 512 determines that an external interferer is very likely, and proceeds to run validation algorithms.

When the radio link is taking errors due to interference, the interference detector 204 in step 514 can determine if the ES and SES indicators are increasing from the previous sample to the current sample, which will indicate that, in the time interval, there were errors detected. This type of interference is explicit and noticeable. If so, the interference detector 204 in step 516 determines that an external interferer is very likely, and proceeds to run validation algorithms.

Performance-affecting interference type A—When the radio link has degraded due to the interference but below the severity level of generating errors, and when the radio link configuration has compensation mechanisms enabled, the PTP system 100 may be trying to compensate for the degradation. In some embodiments, such compensation may only be possible if the radio link configuration has such mechanisms enabled. ACM and ATPC are the two most common mechanisms used to compensate for degradation. ATPC increases output power in the far end transmitter (e.g., the first transmitter 112) to try to bring the SNR to the expected nominal value. ACM downshifts coding and/or modulation to compensate for the degradation. Accordingly, the interference detector 204 in step 518 may evaluate whether SNR is greater than or equal to an SNR threshold SNR_Th. If so, then the interference detector 204 in step 520 may evaluate whether ACM is enabled and in step 522 whether there has been a negative ACM change. If so, then the interference detector 204 in step 524 may determine that an external interferer is probable, and then may proceed to run validation algorithms. If ACM in step 520 is not enabled, then the interference detector 204 in step 526 may evaluate whether the Far End ATPC has been enabled. If in step 526 the interference detector 204 determines that the Far End ATPC has been enabled or in step 522 the interference detector 204 determines that there has not been a negative ACM change, then the interference detector 204 in step 528 computes the Far End Power Adjustment. In step 530, the interference detector 204 determines whether the computed Power Adjustment is greater than a Power Adjustment Threshold. If so, then the interference detector 204 in step 524 may determine that an external interferer is probable, and then may proceed to run validation algorithms. If SNR is less than the SNR Threshold, or the radio link configuration does not have any compensation mechanisms enabled, or the Far End Power Adjustment is less than the Power Adjustment Threshold, then the interference detector 204 may default to evaluating the performance affecting interference B criteria, discussed below. This type of interference is not explicit and can easily go unnoticed.

Performance-affecting interference type B—When the radio link has degraded due to the interference but below the severity level of generating errors, and when the radio link configuration does not have compensation mechanisms enabled or the interference is too low to trigger any compensation action, the interference detector 204 may use a more sensitive set of parameters based on the U-BER. The U-BER identifies how hard the Forward Error Correction decoder is working to clean the received signal, e.g., how many errors are being corrected in every FEC frame that goes across the receiver. The more errors being corrected, the more likely that the PTP system 100 will reach a point where it cannot correct them all in a given FEC frame and thus will have an uncorrectable frame. Although it uses a similar criterion as the SNR, U-BER is considerably more sensitive and allows the system to detect degradation even before the SNR starts degrading. In some embodiments, the interference detector 204 in step 532 computes the change in U-BER, and in step 534 determines whether the change in U-BER is greater than or equal to an U-BER Threshold (U-BER_Th). If so, then the interference detector 204 in step 536 determines that an external interferer is probable, and proceeds to run validation algorithms. If not, then the interference detector 204 determines that, for the record of parameters collected during the current instance in time, the radio link was not being affected or at least not being affected significantly enough by an interferer to be detected. This type of interference is not explicit and can easily go unnoticed.

If at least one of the degradation conditions is met, the interference detection system 126 may proceed with validation processes to validate and/or classify the type of interference and/or whether the detected interference may be considered a false positive. The interference detection system 126 may consider the following validation factors:

1. Persistence—The interference detection system 126 validates the duration of interference, thus enabling determination of false positives, short single interference bursts, burst interferers that are constantly affecting the radio link, and/or steady interferers.
2. Multipath—Using the processes noted above with regard to FIG. 4, the interference detection system 126 validates if the type of interference may be due to multipath.
3. Symmetry—The interference detection system 126 validates if the same degradation pattern is happening in both directions of the radio link. If the degradation is symmetric, external interference is unlikely as it is usually not symmetric in nature.
4. Historical references and regular/irregular behavior—The interference detection system 126 validates against data for this radio link from the historical database, e.g., to determine if the interference pattern is happening at regular intervals or if it is showing irregular behavior. This information may be used as part of the analysis that should lead to a corrective action.

Details of the validation processes will be discussed below.

Figure 6:
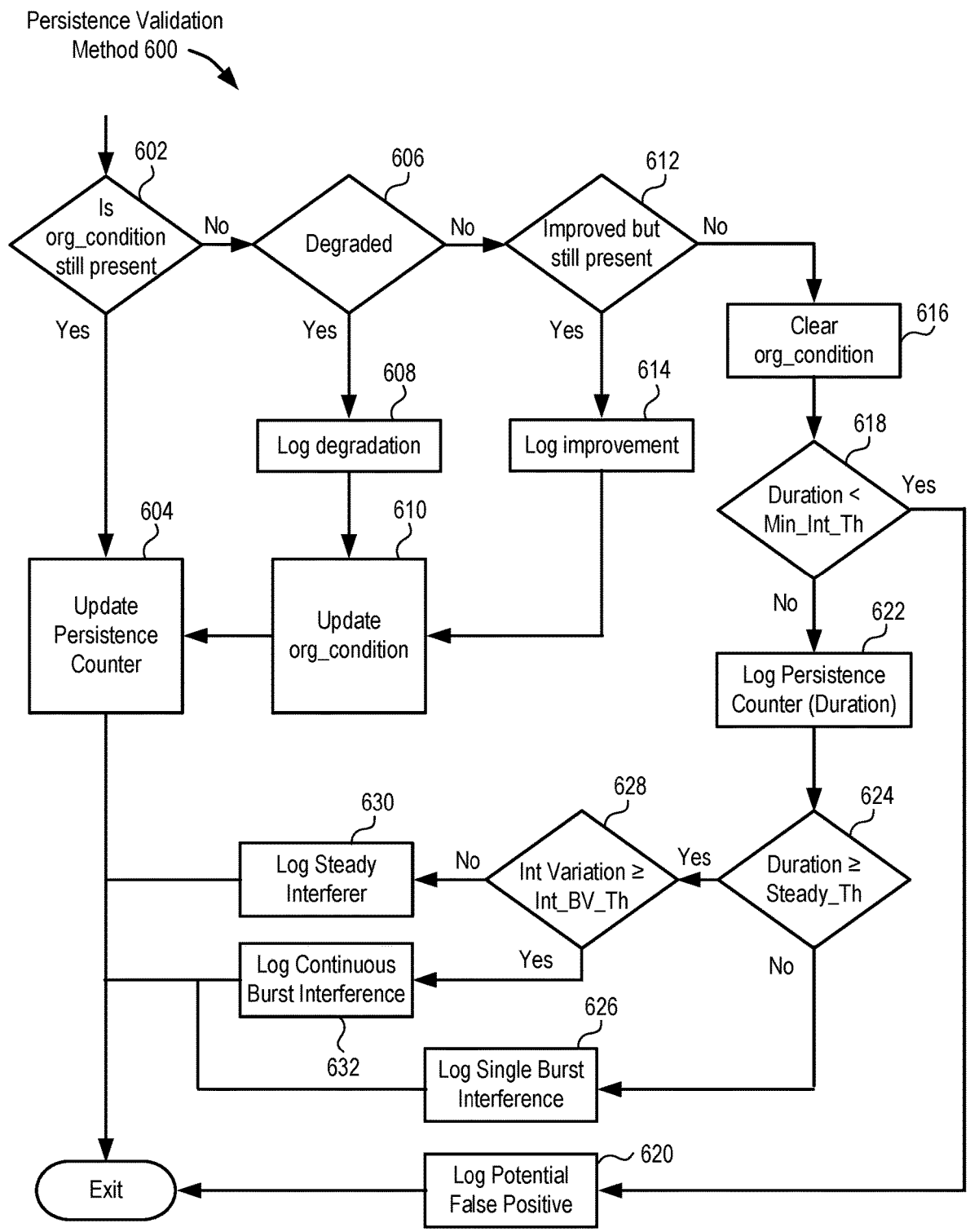
FIG. 6 is a flowchart illustrating a method of validating an interference detection based on persistence, in accordance with some embodiments of the present invention.

FIG. 6 is a flowchart illustrating a method 600 of validating a detected interference based on interference persistence (interference duration) and classifying false positives, single burst interference, burst continuous interference and steady interferers, in accordance with some embodiments of the present invention.

The validation/classification engine 206 may evaluate interference persistence. In some embodiments, the validation/classification engine 206 evaluates consecutive samples (forward in time) from a moment an interferer is detected. If the detected condition is no longer present, then the validation/classification engine 206 may track interference as it improves or worsens and ultimately detect when the interference stops.

In step 602, the validation/classification engine 206 determines if the detected condition remains present. If so, then the validation/classification engine 206 in step 604 updates a persistence counter and proceeds to exit. If not, then validation/classification engine 206 proceeds to step 606.

In step 606, the validation/classification engine 206 determines if the detected condition has degraded. If the condition has degraded, the validation/classification engine 206 in step 608 logs the degradation in the historical database 210 (possibly with the assistance of the data storage engine 208), in step 610 updates the detected condition, and proceeds to step 604 to update the persistence counter. If the condition has not degraded, the validation/classification engine 206 in step 612 determines whether the condition has improved but interference still remains present. If so, then the validation/classification engine 206 in step 614 logs the improvement, and proceeds to step 610 to update the detected condition and to step 604 to update the persistence counter.

If the original condition has improved and interference is no longer present, then the validation/classification engine 206 in step 616 clears the original condition, and in step 618 determines whether the duration of the original condition is less than the minimum interference threshold. If so, then the validation/classification engine 206 in step 620 logs a potential false positive. Since an interferer may be present for an indefinite period of time, the validation/classification engine 206 may implement a boundary condition to stop metering the interference duration once it crosses a predefined limit. The validation/classification engine 206 may wait for a minimum number of samples without interference before the validation/classification engine 206 declares the radio link interference free. This will create a level of hysteresis to reduce toggling conditions. In some embodiments, the validation/classification engine 206 identifies interferers having a short duration, e.g., only one or two samples long, as false positives. Short interferences may be triggered by anomalies in measurement or glitches in the sampling process. Although the validation/classification engine 206 may not send an alarm to a link operator when a false positive is determined, the validation/classification engine 206 may record the occurrence of the false positive to determine in the future if there exists a recurring pattern.

If the duration of the original condition is greater than or equal to the minimum interference threshold, then the validation/classification engine 206 in step 622 logs the persistence duration (e.g., the persistence counter value), and in step 624 determines whether the persistence duration is greater than a steady threshold. If not, then the validation/classification engine 206 in step 626 classifies the interference as a single burse interference and logs the single burst interference.

If the interference duration is greater than the steady threshold, then the validation/classification engine 206 in step 628 determines whether the interference variation is greater than an interference variation threshold. If so, then the validation/classification engine 206 in step 632 classifies the interference as a continuous burst interference and logs the continuous burst interference. If not greater than the interference variation threshold, then the validation/classification engine 206 in step 630 classifies the interference as a steady interferer and logs the steady interferer.

The validation/classification engine 206 identifies interference that continuously affects the radio link over a longer duration while the SNR (or any other link performance degradation parameter) is showing an oscillating pattern of several dB as a burst interference. This will be represented as a predetermined larger duration threshold. In some embodiments, the validation/classification engine 206 may be unable to detect a burst interference due to the severity level of the interference, especially if the radio link is lost. Further, the validation/classification engine 206 classifies an interference with a long duration and constant or relatively constant intensity that translates into a steady degradation of SNR (or any other link performance degradation parameter) as a steady interference.

Figure 7:
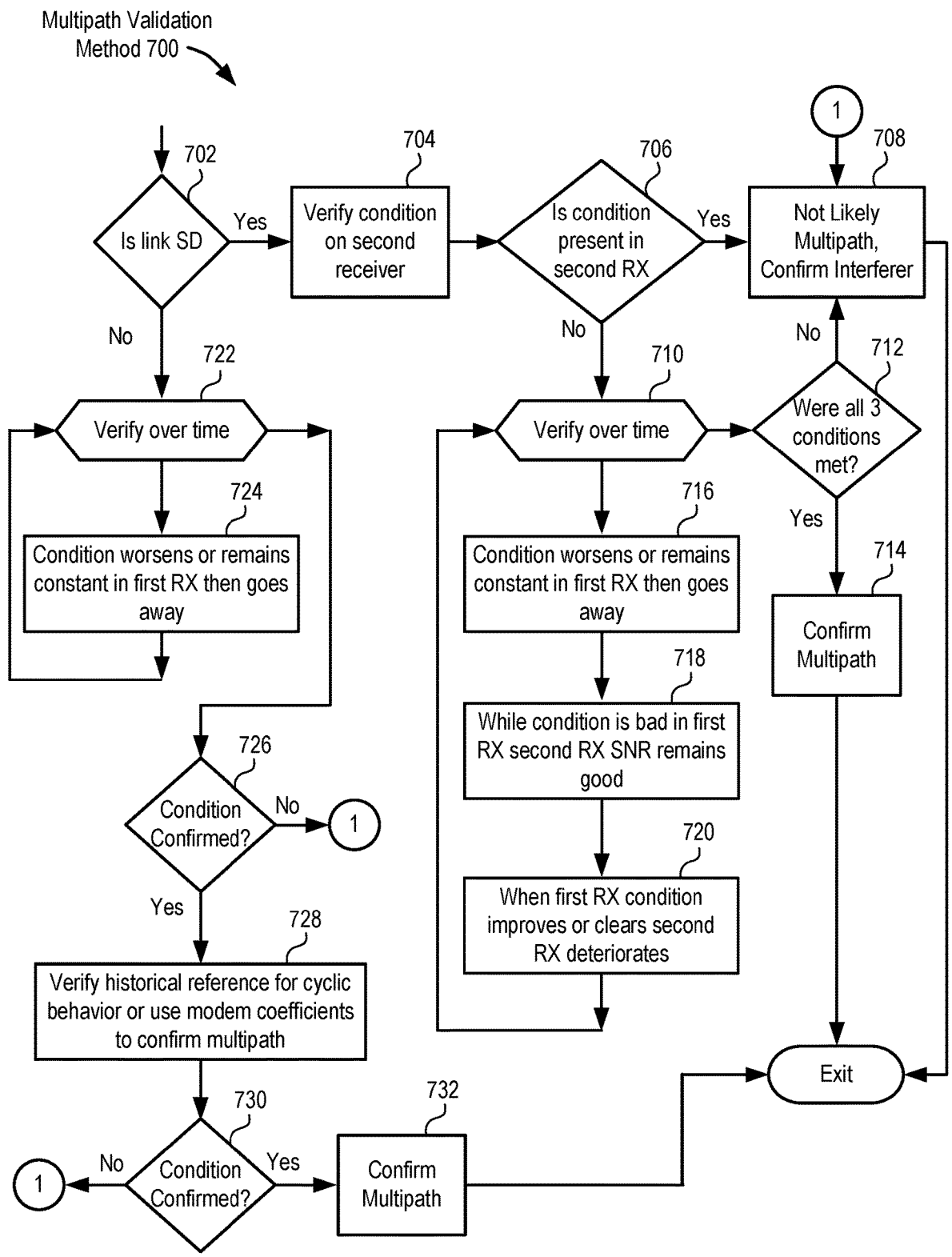
FIG. 7 is a flowchart illustrating a method of validating an interference detection based on multipath effects, in accordance with some embodiments of the present invention.

FIG. 7 is a flowchart illustrating a method of discriminating an external interference from multipath interference, in accordance with some embodiments of the present invention. In some embodiments, the validation/classification engine 206 may evaluate one or both of two configurations, namely, when the configuration includes a space diversity (SD) link and/or when it does not. Accordingly, in step 702, the validation/classification engine 206 determines whether the link is a space diversity link.

In the space diversity case, the validation/classification engine 206 in step 704 presumes that both receivers will not be affected at the same time, when the interference is due to multipath. So, in some embodiments, the validation/classification engine 206 tracks the interference in a first receiver over a number of consecutive samples and in a second receiver over a number of consecutive samples. The validation/classification engine 206 expects the second receiver to be unaffected after the interference stops in the first receiver, and expects within a predetermined amount of time the second receiver to start showing the effects of the interference and then to eventually disappear. If the validation/classification engine 206 does not detect those conditions, e.g., the condition is present in both receivers, then the validation/classification engine 206 in step 708 may determine that the interference is due to an external interferer. If the validation/classification engine 206 in step 706 detects those conditions, e.g., the condition is not present in the second receiver, then the validation/classification engine 206 may determine that the interference is due to multipath. The validation/classification engine 206 in step 710 verifies the condition over time, namely, in step 716 determines whether the condition worsens or remains constant in the first receiver and then goes away, in step 718 determines that, while the condition is bad in the receiver, the second receiver has an SNR that remains good, and in step 720 determines that, while the first receiver condition improves or clears the second receiver deteriorates. In step 712, the validation/classification engine 206 determines whether the three conditions were met. If not, then the validation/classification engine 206 proceeds to step 708 to determine that the interference is unlikely due to multipath. If all three conditions were met, then the validation/classification engine 206 in step 714 determines the interference is likely due to multipath.

In the non-space diversity case, the validation/classification engine 206 in step 722 monitors for an interference that it detects in step 724 as present in the receiver for only a predetermined amount of time and then disappears (same as in the space diversity case). The validation/classification engine 206 in step 726 determines whether the condition has been confirmed. If not, then the validation/classification engine 206 proceeds to step 708 and determines that multipath interference is unlikely. If the condition is present, then, because the PTP system 100 does not have a second receiver to confirm the multipath condition, the validation/classification engine 206 in step 728 verifies historical reference to cyclic behavior or modem coefficients indicative of multipath. That is, the validation/classification engine 206 may depend on one or more of the following:

1. The cyclical nature of multipath—Multipath may be due to naturally occurring phenomena that occur when natural events take place, like the tide coming in or out of a particular seashore. To identify a multipath condition, the validation/classification engine 206 in step 728 may use records in the historical database 210 for the radio link to determine whether a repetitive interference pattern coincides with the naturally occurring phenomena. In some embodiments, different naturally occurring events may occur with several hours of each other such that the different event types can cause different interference patterns. In some embodiments, the validation/classification engine 206 in step 728 may use records from the historical database 210 for the radio link to identify the patterns of the different events.
2. Use of additional modem coefficients—The validation/classification engine 206 in step 728 may evaluate equalizer coefficients detected during the interference and may compare the detected coefficients with ones collected after the interference is gone. The validation/classification engine 206 may identify an equalizer coefficient pattern when the type of interference is due to multipath, as the equalizer will try to align the two signals to compensate for it.

If the validation/classification engine 206 in step 730 confirms a multipath condition using the above tests, then the validation/classification engine 206 in step 732 classifies the interference as multipath. If the validation/classification engine 206 cannot confirm a multipath condition using the above tests, then the validation/classification engine 206 may classify the interference as caused by an external interferer. If the validation/classification engine 206 cannot confirm a multipath condition but detects sufficient evidence that it is possible, then the validation/classification engine 206 may report the event as an external interferer but flag it in the historical database 210 as potentially multipath in case the information can be used to confirm it or a different event in the future.

It will be appreciated that there may be relationships between the techniques used to detect multipath and the tests used to detect persistence. In some embodiments, the validation/classification engine 206 may skip performing the multipath process if the interference persistence process shows that the interference type is either a steady or continuous burst.

Figure 8:
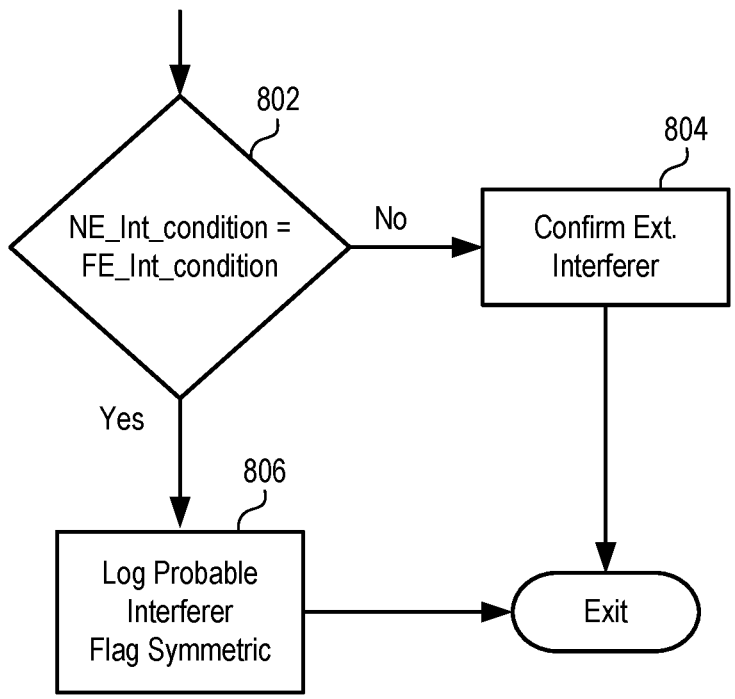
FIG. 8 is a flowchart illustrating a method of validating an interference detection based on symmetry, in accordance with some embodiments of the present invention.

FIG. 8 is a flowchart illustrating a method 800 of validating a detected interference based on symmetry, in accordance with some embodiments of the present invention.

External interference in PTP radio links are usually asymmetric. By validating that substantially the same degradation pattern is happening in both directions of the radio link, the validation/classification engine 206 may flag the event only as a probable interferer (not confirmed) and may record the probable interferer event as such in the historical database 210 for the radio link. By flagging the probable interferer event as such, the validation/classification engine 206 may be able to confirm the event in the future, e.g., if a future interferer event in this radio link are asymmetrical.

To determine if the interference is symmetric, the validation/classification engine 206 in step 802 correlates the interference analysis in the near end receiver with the same interference analysis in the far end receiver. The validation/classification engine 206 preferably conducts this correlation using samples from the same temporal snapshot. If the near end interference condition is different than the far end interference condition, then the validation/classification engine 206 in step 804 logs the asymmetry and a probable external interferer. If the near end interference condition is substantially the same as the far end interference condition, then the validation/classification engine 206 in step 806 logs the symmetry and the unlikelihood of an external interferer.

Figure 9:
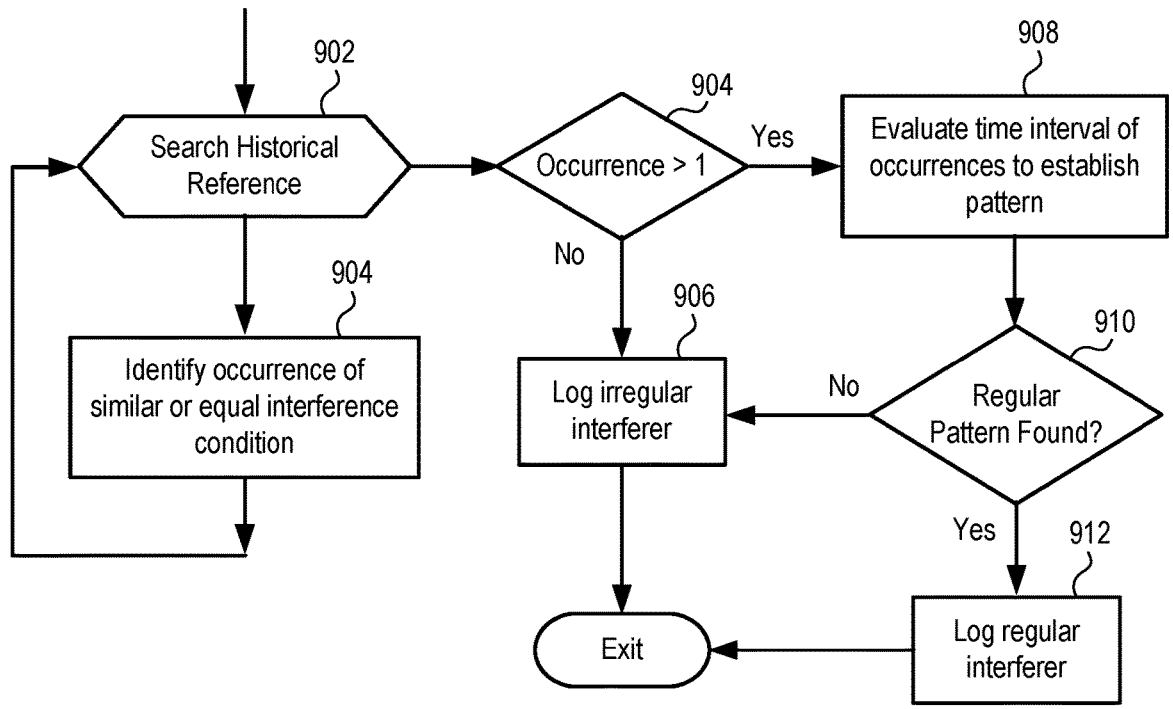
FIG. 9 is a flowchart illustrating a method of validating an interference detection based on patterns, in accordance with some embodiments of the present invention.

FIG. 9 is a flowchart illustrating a method 900 of validating a detected interference based on regular/irregular patterns identified in the historical database 210, in accordance with some embodiments of the present invention.

The historical database 210 stores the different conditions detected in the radio link over time. In some embodiments, the validation/classification engine 206 evaluates records in the historical database 210 to determine if interference is repeating at regular or irregular intervals or patterns. When looking for a specific pattern, the validation/classification engine 206 may, in different embodiments, look at a different number of past records and/or a different amount of elapsed time. The validation/classification engine 206 may look for lunar patterns, seasonal patterns, weather patterns, time of day patterns, etc.

As described herein, the validation/classification engine 206 can search the historical database 210 to determine if the type of interference is attributable to multipath in non-space diversity links and to track those links that are labeled as having probable interference due to its original detection showing symmetric behavior. The validation/classification engine 206 may use the information as part of the analysis that could lead to a corrective action. The validation/classification engine 206 may use the information to enhance the link and network health reports.

In step 902, the validation/classification engine 206 searches the records of the historical database 210. The validation/classification engine 206 in step 904 identifies the occurrence of similar and/or equivalent interference conditions. When the validation/classification engine 206 in step 904 identifies only one occurrence, the validation/classification engine 206 classifies and logs the interference as irregular. When the validation/classification engine 206 in step 904 identifies more than one occurrence, the validation/classification engine 206 in step 908 evaluates the time interval of the occurrence (or compares the timing with weather records or other patterns) to attempt to establish a pattern (or correlation). If the validation/classification engine 206 detects a pattern in step 910, the validation/classification engine 206 in step 912 classifies and logs the interference as regular. If the validation/classification engine 206 does not detect a pattern in step 910, then the validation/classification engine 206 proceeds to step 906 to classify and log the interference as irregular.

Figure 10:
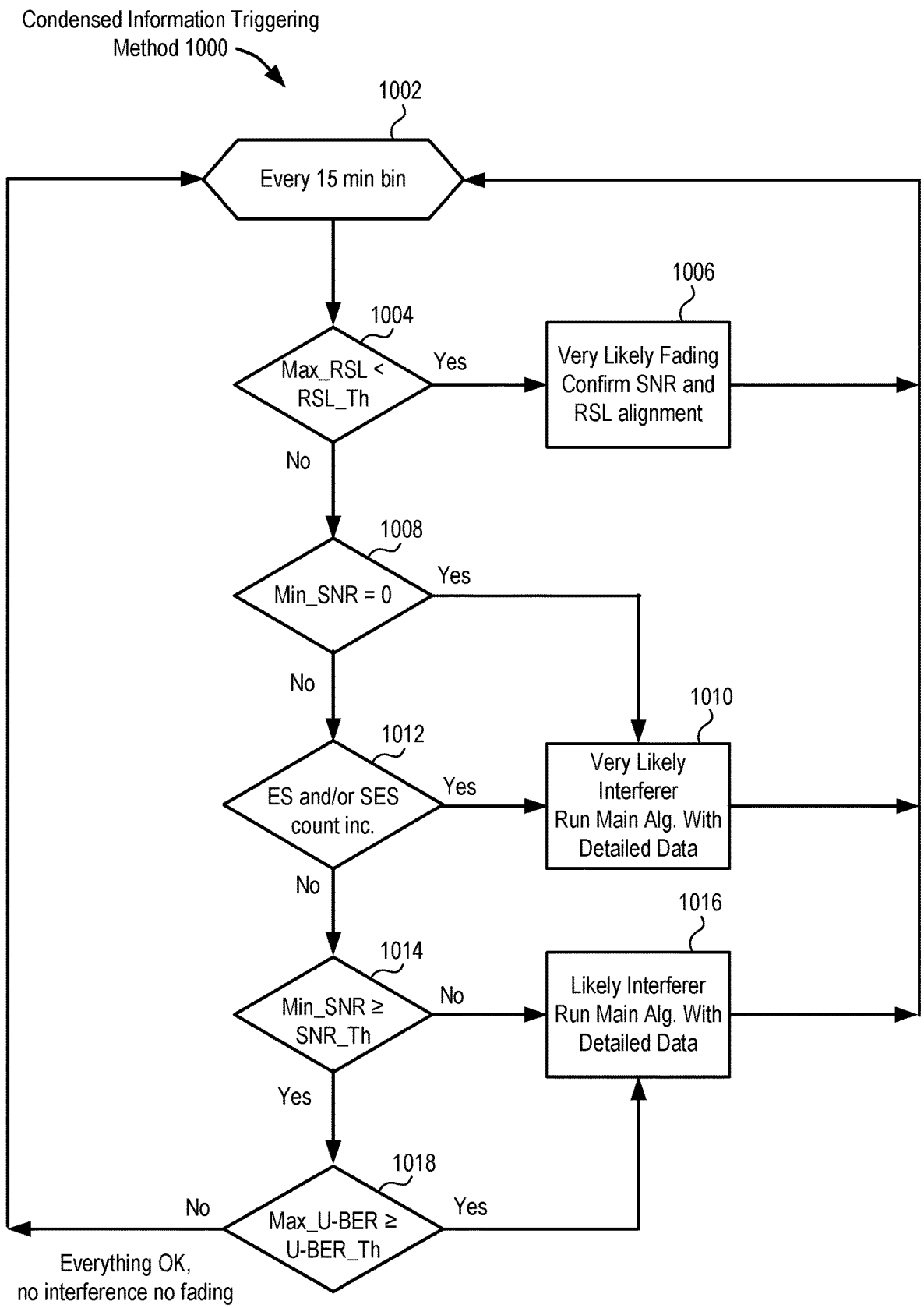
FIG. 10 is a flowchart illustrating a method of using condensed information to trigger the interference detection method, in accordance with some embodiments of the present invention.

FIG. 10 is a flowchart illustrating a method of triggering performance of the main method 500 based on condensed information, in accordance with some embodiments of the present invention.

The condensed evaluation engine 212 can use condensed information to screen which radio links may be showing signs of degradation due to interference during a time period. The condensed evaluation engine 212 may store condensed information in bins that keep track of maximum and minimum levels of certain link performance parameters during each specific period of time associated with the bin. In some embodiments, the condensed evaluation engine 212 may maintain 15-minute bins that record maximum and minimum levels for important link performance parameters like RSL, SNR, ES, SES, U-BER, etc. In some embodiments, the condensed evaluation engine 212 may evaluate the data within the 15-minute bins to determine the possibility of an external interference having occurred within that time period.

Although the bins are being described as containing information corresponding to a 15-minute window of time, the bins can contain any length of time, albeit in some embodiments longer than a number of temporal snapshots that exceeds the likelihood of temporal correlation of radio parameters. Accordingly, condensed information alone may be insufficient to confirm whether interference is present during a specified period of time, because the values stored in the bins are not time correlated with each other. In other words, in some embodiments, the interference detection system 126 cannot guarantee that when a low SNR value is detected in a bin, its corresponding RSL value was high or low at the time. Such conditions may both be happening within the same bin, but not necessarily in the same temporal snapshot.

In some embodiments, the condensed evaluation engine 212 may only trigger the more detailed interference analysis of the main method 500 when there is enough evidence in a bin to suggest that a potential interferer may be present. That way, the interference detection system 126 may avoid unnecessarily wasting system resources and increasing computational costs.

In some embodiments, the condensed evaluation engine 212 starts in step 1002 by selecting a bin. The condensed evaluation engine 212 in step 1004 checks if the maximum RSL level of the bin never exceeded the pre-determined RSL threshold. If so, then the condensed evaluation engine 212 in step 1006 may presume that there has been a fading condition during the whole time period. If the condensed evaluation engine 212 in step 1004 detects a maximum RSL level that exceeded the RSL threshold for any portion of the time period, the condensed evaluation engine 212 may proceed to check for link degradation conditions.

As in the main method 500, the condensed evaluation engine 212 may check the more severe interference conditions, e.g., in step 1008 using min SNR equal to zero as an indicator of the link losing lock and in step 1012 ES and/or SES increments as an indicator of errors being generated. If the condensed evaluation engine 212 detects any of these more severe interference conditions in the condensed information, with the RSL being high enough at least for a portion of the bin, the condensed evaluation engine 212 in step 1010 determines a very high likelihood of an external interference and triggers execution of the main method 500 using the detailed data for that radio link and over that specific time period.

The condensed evaluation engine 212 may check the less severe interference conditions, e.g., in step 1014 low SNR values as an indicator of link performance degradation and in step 1018 the maximum U-BER value being high enough to indicate link performance degradation. If the condensed evaluation engine 212 detects any of these conditions in the condensed information, with the RSL being high enough at least for a portion of the bin, the condensed evaluation engine 212 in step 1016 determines a likelihood of an external interference and triggers execution of the main method 500 using the detailed data for that radio link and over that specific time period.

If the condensed evaluation engine 212 does not detect a likelihood of an external interferer, the condensed evaluation engine 212 may determine that there is a low likelihood of an external interference, and returns to step 1002 to evaluate another bin.

In some embodiments, when the condensed evaluation engine 212 detects a possible external interference based on the parameters of a bin, the condensed evaluation engine 212 may cause interference detection of the radio link in real time, in addition to and/or instead of a detailed evaluation of the radio link within the time period associated with the bin.

Figure 11:
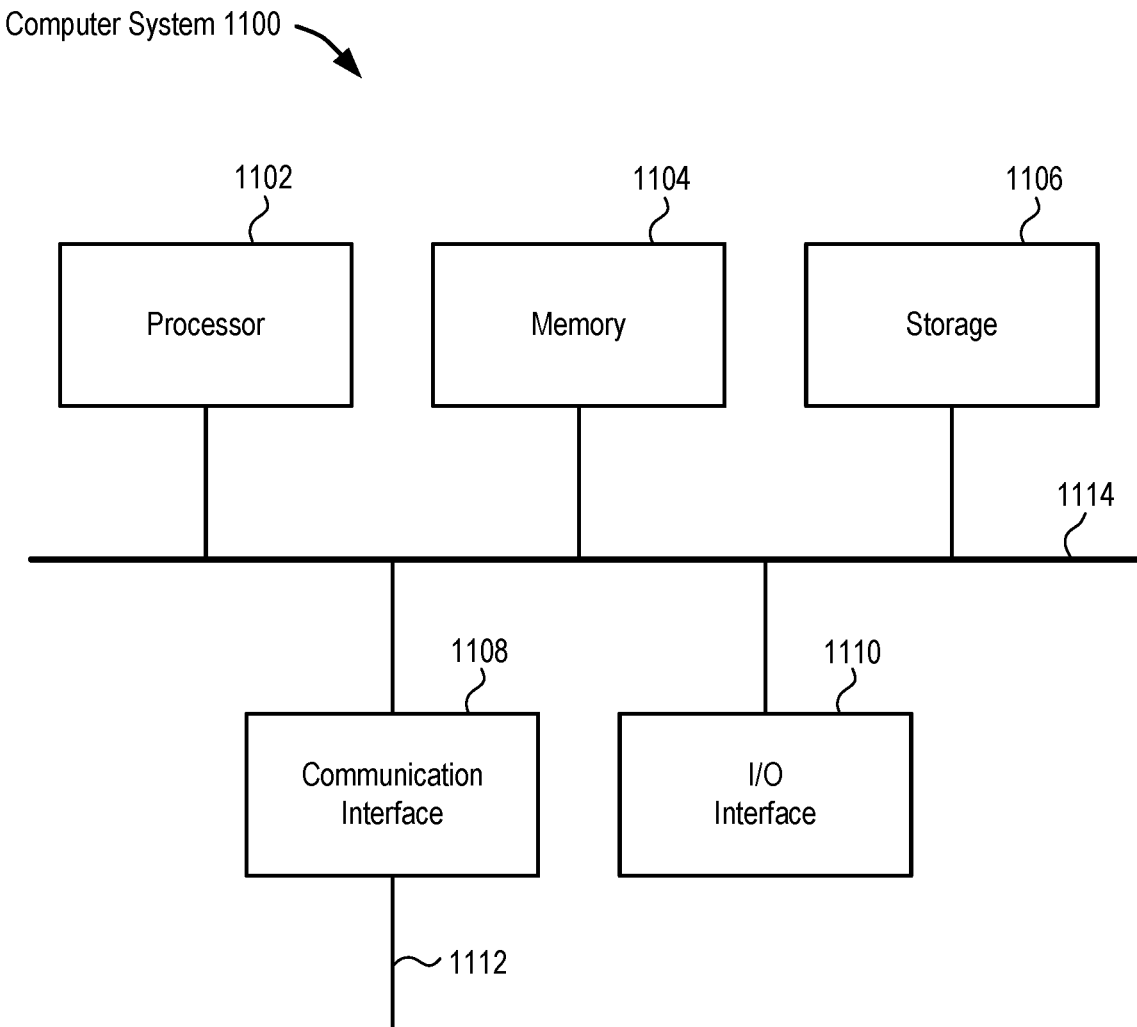
FIG. 11 is a block diagram illustrating details of a computer system.

FIG. 11 is a block diagram illustrating details of a computer system 1100. Any of the systems, engines, databases, and/or networks described herein may comprise an instance of one or more computer systems 1100. In some embodiments, functionality of the computer system 1100 is improved to the perform some or all of the functionality described herein. The computer system 1100 comprises a processor 1102, memory 1104, storage 1106, a communication network interface 1108, and an input/output (I/O) interface 1110, communicatively coupled to a communication channel 1114. The processor 1102 is configured to execute executable instructions (e.g., programs). In some embodiments, the processor 1102 comprises circuitry or any processor capable of processing the executable instructions.

The memory 1104 stores data. Some examples of memory 1104 include storage devices, such as RAM, ROM, RAM cache, virtual memory, etc. In various embodiments, working data is stored within the memory 1104. The data within the memory 1104 may be cleared or ultimately transferred to the storage 1106.

The storage 1106 includes any storage configured to retrieve and store data. Some examples of the storage include flash drives, hard drives, optical drives, cloud storage, and/or magnetic tape. Each of the memory 1104 and the storage 1106 comprises a computer-readable medium, which stores instructions or programs executable by the processor 1102.

The I/O interface 1110 may include any device that inputs data (e.g., mouse and keyboard) and any device that outputs data (e.g., a speaker or display).

The communication network interface 1108 may support communication over an Ethernet connection, a serial connection, a parallel connection, and/or an ATA connection. The communication network interface 1108 may also support wireless communication (e.g., 802.11 db/g/n, WiMax, LTE, WiFi). It will be apparent that the communication network interface 1108 may support many wired and wireless standards. The communication network interface 1108 may be coupled to a network (e.g., computer network 128) via the link 1112.

The elements of the computer system 1100 are not limited to those depicted in FIG. 11. A computer system 1100 may comprise more or less hardware, software and/or firmware components than those depicted (e.g., drivers, operating systems, touch screens, biometric analyzers, and/or the like). Further, elements may share functionality and still be within various embodiments described herein. For example, encoding and/or decoding may be performed by the processor 1102 and/or a co-processor located on a GPU (i.e., NVidia).

It will be appreciated that the terms "engine", "system" "module" and/or "database" may comprise software, hardware, firmware, and/or circuitry. In one example, one or more software programs comprising instructions capable of being executable by a processor may perform one or more of the functions of the engines, databases, modules or systems described herein. In another example, circuitry may perform the same or similar functions. Alternative embodiments may comprise more, less, or functionally equivalent engines, systems, modules or databases, and still be within the scope or present embodiments. For example, the functionality of the various systems, engines, modules and/or databases may be combined or divided differently. The databases may include cloud storage. It will further be appreciated that the term "or" as used herein may be construed in either an inclusive or exclusive sense. Moreover, plural instances may be provided for resources, operations, or structures described herein as a single instance.

The database described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

The systems, methods, engines, modules, and/or databases described herein may be at least partially processor-implemented, with a particular processor or processors being an example of hardware. For example, at least some of the operations herein may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order described and/or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The table below lists abbreviations that may have been used in this document.

| Term | Description |
| --- | --- |
| ACM | Adaptive Coding and Modulation |
| ATPC | Automatic transmit power control |
| BER | Bit Error Rate/Bit Error Ratio |
| dB | Decibel, logarithmic unit of signal ratio |
| dBm | Decibel referenced to 1 mW |
| DNL | Demodulator not locked alarm |
| ES | Errored Seconds |
| FDD | Frequency Division Duplexing |
| FE | Far End - Usually referring to the other side of a radio link |
| FEC | Forward Error Correction |
| IDU | In Door Unit |
| NE | Near End - Usually referring to the local side of the radio link |
| NMS | Network Management System |
| ODU | Out Door Unit |
| QAM | Quadrature Amplitude Modulation |
| QPSK | Quaternary (Quadraphase) Phase Shift Keying |
| RBER | Residual Bit Error Rate |
| RSL | Receive signal level, in units of dBm |
| SES | Severely Errored Seconds |
| SNR | Signal to Noise Ratio |
| TDD | Time Division Duplexing |
| U-BER | Uncoded Bit Error Rate |

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

The invention claimed is:

1. An interference detection system in a point-to-point radio system, the point-to-point radio system including a first site in radio communication with a second site, comprising:
    at least one processor; and
    memory storing computer instructions, the computer instructions when executed by the at least one processor configured to cause the system to perform,
        gathering during a specific time period a set of temporal snapshots of radio parameter values associated with at least a first site of a point-to-point radio system, the radio parameter values of each temporal snapshot including at least a receive signal level (RSL) value and at least one other radio parameter value correlated with signal degradation during the temporal snapshot;
        determining a maximum RSL value in the set of RSL values of the set of temporal snapshots;
        determining whether the maximum RSL value is greater than an RSL threshold;
        selecting a particular at least one other radio parameter value from in the set of at least one other radio parameter values of the set of temporal snapshots;
        determining whether the particular at least one other radio parameter value indicates a threshold level of signal degradation during the set of temporal snapshots;
        at least when the maximum RSL value is greater than the RSL threshold and the particular at least one other radio parameter value indicate a threshold level of signal degradation, then determining that external interference is likely present during the set of temporal snapshots;
        at least when the maximum RSL value is not greater than the RSL threshold, then determining that the external interference is likely not present during the set of temporal snapshots; and
        performing one or more individual temporal snapshot evaluations for external interference in response to a determination of the external interference being likely present during the set of temporal snapshots.

2. The interference detection system of claim 1, wherein the computer instructions configured to cause the system to perform one or more individual temporal snapshot evaluations comprise computer instructions configured to cause the system to perform,
    gathering a particular temporal snapshot of particular radio parameter values associated with at least the first site, the particular radio parameter values including at least a particular RSL value and a particular at least one other radio parameter value correlated with signal degradation during the particular temporal snapshot;
    determining whether the particular RSL value is greater than the RSL threshold;
    determining whether the particular at least one other radio parameter value indicates the threshold level of signal degradation during the particular temporal snapshot;
    at least when the particular RSL value is greater than the RSL threshold and the particular at least one other radio parameter value indicates the threshold level of signal degradation during the particular temporal snapshot, then determining that external interference is likely present during the particular temporal snapshot; and
    at least when the particular RSL value is not greater than the RSL threshold, then determining that the external interference is likely not present during the particular temporal snapshot.

3. The interference detection system of claim 1, wherein the radio parameter values include radio parameter values associated with a modem and a radio frequency unit at the first site during each temporal snapshot.

4. The interference detection system of claim 1, wherein the at least one other radio parameter value includes a Demodulator Not Locked (DNL) Alarm, and wherein the at least one other radio parameter value indicates a threshold level of signal degradation at least when the DNL Alarm is active.

5. The interference detection system of claim 1, wherein the at least one other radio parameter value includes Errored Seconds (ES) or Severely Errored Seconds (SES) value, and wherein the at least one other radio parameter value indicates a threshold level of signal degradation at least when the ES or SES value is increasing from a previous sample.

6. The interference detection system of claim 1, wherein the at least one other radio parameter value includes a signal-to-noise ratio (SNR) value, and wherein the at least one other radio parameter value indicates a threshold level of signal degradation at least when at least the SNR value is less than a threshold.

7. The interference detection system of claim 1, wherein the at least one other radio parameter value includes a change in an Uncoded Bit Error Rate (U-BER), and wherein the at least one other radio parameter value indicates a threshold level of signal degradation at least when the change in the U-BER is greater than a threshold.

8. The interference detection system of claim 1, wherein the at least one other radio parameter includes Adaptive Code Modulation (ACM) data, and wherein the at least one other radio parameter value indicates a threshold level of signal degradation at least when ACM is active and negative.

9. The interference detection system of claim 1, wherein the at least one other radio parameter value includes Automatic Transmit Power Control (ATPC) data, and wherein the at least one other radio parameter value indicates a threshold level of signal degradation at least when ATPC is enabled and a power adjustment is greater than a threshold.

10. The interference detection system of claim 1, wherein the computer instructions when executed by the processor are further configured to cause the system to perform
evaluating interference persistence; and
determining a false positive at least when the interference persistence is less than a minimum threshold duration.

11. The interference detection system of claim 10, wherein the computer instructions when executed by the processor are further configured to cause the system to perform
determining an amount of interference variation;
identifying the external interference as a steady interferer at least when the amount of interference variation is less than a threshold; and
identifying the external interference as a continuous bursty interferer at least when the amount of interference variation is greater than the threshold.

12. The interference detection system of claim 1, wherein the computer instructions when executed by the processor are further configured to cause the system to perform
determining first interference effects on a first receiver at the first site in space diversity with a second receiver at the first site;
determining second interference effects on the second receiver at the first site;
comparing the first interference effects with the second interference effects; and
at least when the first interference effects are substantially the same as the second interference effects, then validating the external interference.

13. The interference detection system of claim 1, wherein the computer instructions when executed by the processor are further configured to cause the system to perform
determining first SNR on a first receiver at the first site in space diversity with a second receiver at the first site;
determining second SNR on the second receiver; and
at least when the first SNR indicates signal degradation while the second SNR does not indicate signal degradation and when thereafter the first SNR improves or clears while the second SNR deteriorates, then identifying the external interference as a likely multipath interference.

14. The interference detection system of claim 1, wherein the computer instructions when executed by the processor are further configured to cause the system to perform
comparing a near-end interference condition with a far-end interference condition; and
at least when the near-end interference condition is not substantially similar to the far-end interference condition, the validating the external interference.

15. The interference detection system of claim 1, wherein the computer instructions when executed by the processor are further configured to cause the system to perform
searching a historical database for records indicative of an interference pattern or correlation with external events; and
using the interference pattern or correlation with external events to assist in identifying future interferences as not being due to an external interferer.

16. The interference detection system of claim 1, wherein the one or more individual temporal snapshot evaluations includes an evaluation of a temporal snapshot of radio parameter values within the set of temporal snapshots.

17. The interference detection system of claim 1, wherein the specific time period includes a 15-minute time period.

18. An interference detection method in a point-to-point radio system, the point-to-point radio system including a first site in radio communication with a second site, comprising:
gathering during a specific time period a set of temporal snapshots of radio parameter values associated with at least a first site of a point-to-point radio system, the radio parameter values of each temporal snapshot including at least a receive signal level (RSL) value and at least one other radio parameter value correlated with signal degradation during the temporal snapshot;
determining a maximum RSL value in the set of RSL values of the set of temporal snapshots;
determining whether the maximum RSL value is greater than an RSL threshold;
selecting a particular at least one other radio parameter value from in the set of at least one other radio parameter values of the set of temporal snapshots;
determining whether the particular at least one other radio parameter value indicates a threshold level of signal degradation during the set of temporal snapshots;
at least when the maximum RSL value is greater than the RSL threshold and the particular at least one other radio parameter value indicate a threshold level of signal degradation, then determining that external interference is likely present during the set of temporal snapshots;
at least when the maximum RSL value is not greater than the RSL threshold, then determining that the external interference is likely not present during the set of temporal snapshots; and
performing one or more individual temporal snapshot evaluations for external interference in response to a determination of the external interference being likely present during the set of temporal snapshots.

19. The interference detection method of claim 18, wherein the step of performing one or more individual temporal snapshot evaluations includes,
gathering a particular temporal snapshot of particular radio parameter values associated with at least the first site, the particular radio parameter values including at least a particular RSL value and a particular at least one other radio parameter value correlated with signal degradation during the particular temporal snapshot;
determining whether the particular RSL value is greater than the RSL threshold;
determining whether the particular at least one other radio parameter value indicates the threshold level of signal degradation during the particular temporal snapshot;

at least when the particular RSL value is greater than the RSL threshold and the particular at least one other radio parameter value indicates the threshold level of signal degradation during the particular temporal snapshot, then determining that external interference is likely present during the particular temporal snapshot; and at least when the particular RSL value is not greater than the RSL threshold, then determining that the external interference is likely not present during the particular temporal snapshot.

20. The interference detection method of claim 18, further comprising evaluating interference persistence; and determining a false positive at least when the interference persistence is less than a minimum threshold duration.

21. The interference detection method of claim 18, further comprising determining an amount of interference variation;

identifying the external interference as a steady interferer at least when the amount of interference variation is less than a threshold; and identifying the external interference as a continuous bursty interferer at least when the amount of interference variation is greater than the threshold.

22. The interference detection method of claim 18, further comprising determining first interference effects on a first receiver at the first site in space diversity with a second receiver at the first site;

determining second interference effects on the second receiver at the first site;

comparing the first interference effects with the second interference effects; and at least when the first interference effects are substantially the same as the second interference effects, then validating the external interference.

23. The interference detection method of claim 18, further comprising determining first SNR on a first receiver at the first site in space diversity with a second receiver at the first site;

determining second SNR on the second receiver; and at least when the first SNR indicates signal degradation while the second SNR does not indicate signal degradation and when thereafter the first SNR improves or clears while the second SNR deteriorates, then identifying the external interference as a likely multipath interference.

24. The interference detection method of claim 18, further comprising comparing a near-end interference condition with a far-end interference condition; and at least when the near-end interference condition is not substantially similar to the far-end interference condition, the validating the external interference.

25. The interference detection method of claim 18, further comprising searching a historical database for records indicative of an interference pattern or correlation with external events; and using the interference pattern or correlation with external events to assist in identifying future interferences as not being due to an external interferer.

26. The interference detection method of claim 18, wherein the one or more individual temporal snapshot evaluations includes an evaluation of a temporal snapshot of radio parameter values within the set of temporal snapshots.

* * * * *